(12) United States Patent
Lambach et al.

(10) Patent No.: US 10,570,622 B1
(45) Date of Patent: *Feb. 25, 2020

(54) ROOF ASSEMBLIES, METHODS FOR THEIR MANUFACTURE, AND THE USE OF SUCH ASSEMBLIES IN A BUILDING

(71) Applicant: COVESTRO LLC, Pittsburgh, PA (US)

(72) Inventors: James L. Lambach, McMurray, PA (US); David M. Baily, Upper Saint Clair, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,589

(22) Filed: Nov. 5, 2018

(51) Int. Cl.
*E04D 13/16* (2006.01)
*E04B 5/10* (2006.01)
*E04B 1/76* (2006.01)
*B32B 5/18* (2006.01)
*B32B 15/04* (2006.01)
*B32B 15/095* (2006.01)
(Continued)

(52) U.S. Cl.
CPC ............ *E04D 13/1625* (2013.01); *B32B 5/18* (2013.01); *B32B 15/046* (2013.01); *B32B 15/082* (2013.01); *B32B 15/095* (2013.01); *B32B 15/20* (2013.01); *E04B 1/7654* (2013.01); *E04B 7/00* (2013.01); *H02S 20/23* (2014.12); *H02S 30/10* (2014.12); *H02S 40/345* (2014.12); *H02S 40/425* (2014.12); *B32B 2266/0228* (2013.01); *B32B 2266/0278* (2013.01); *B32B 2307/304* (2013.01); *B32B 2419/06* (2013.01)

(58) Field of Classification Search
CPC ..... E04B 5/02; E04B 5/43; E04B 5/10; E04B 5/12; E04B 1/7654; E04B 1/7658; E04B 1/6804; E04B 1/7608; E04B 1/7666; E04F 15/041; E04F 15/18; E04C 2002/3488; E04C 2002/0434; E04C 2002/0452; E04C 2/34; E04C 2/284; E04D 13/1618; E04D 13/1625; E04D 13/1637
USPC ............ 52/126.1, 220.1, 234, 236.3, 506.01, 52/506.04, 506.06, 650.1, 650.3
See application file for complete search history.

(56) References Cited

U.S. PATENT DOCUMENTS 2,164,138 A * 6/1939 London .................... E04B 2/60
52/327
3,113,401 A 12/1963 Rose
(Continued)

FOREIGN PATENT DOCUMENTS

CA 2461143 A1 9/2005
DE 202004020808 U1 2/2006
(Continued)

OTHER PUBLICATIONS

"Polyurethanes: Chemistry and Technology, Part II Technology," J. H. Saunders & K. C. Frisch, Interscience Publishers, 1964, p. 239.
(Continued)

*Primary Examiner* — Kyle J. Walraed-Sullivan
(74) *Attorney, Agent, or Firm* — Donald R. Palladino

(57) ABSTRACT

Prefabricated insulated roof assemblies, methods for manufacturing such assemblies, and use of these roof assemblies in a building are described. The assemblies include a sheathing panel, I-joists, and rigid foam insulation boards positioned in a cavity formed by the sheathing panel and the I-joists.

33 Claims, 12 Drawing Sheets

(51) Int. Cl.
*B32B 15/082* (2006.01)
*B32B 15/20* (2006.01)
*H02S 20/23* (2014.01)
*H02S 30/10* (2014.01)
*H02S 40/42* (2014.01)
*H02S 40/34* (2014.01)
*E04B 7/00* (2006.01)

(56) References Cited

U.S. PATENT DOCUMENTS

| | | | |
|---|---|---|---|
| 3,921,355 A | 11/1975 | Pennecot | |
| 4,435,928 A | 3/1984 | Huling | |
| 4,472,920 A * | 9/1984 | Simpson | E04B 1/14 52/222 |
| 4,604,846 A * | 8/1986 | Ekstrom | E04B 1/7608 411/480 |
| 4,700,521 A | 10/1987 | Cover | |
| 5,079,885 A | 1/1992 | Dettbarn | |
| 5,119,612 A | 6/1992 | Taylor et al. | |
| 5,353,560 A | 10/1994 | Heydon | |
| 6,729,094 B1 * | 5/2004 | Spencer | E04B 5/10 52/334 |
| 7,827,763 B2 | 11/2010 | Brown et al. | |
| 8,046,969 B2 | 11/2011 | Dagher et al. | |
| 8,122,681 B2 | 2/2012 | Wrass et al. | |
| 8,141,313 B2 | 3/2012 | Dagher et al. | |
| 8,661,770 B2 | 3/2014 | Wrass et al. | |
| 8,925,269 B1 | 1/2015 | Beaudin | |
| 9,175,476 B2 | 11/2015 | Wrass et al. | |
| 9,689,165 B2 | 6/2017 | Wrass et al. | |
| 2006/0096205 A1 * | 5/2006 | Griffin | E04C 2/296 52/309.4 |
| 2007/0022711 A1 * | 2/2007 | Paradis | E04C 2/296 52/796.1 |
| 2007/0193161 A1 * | 8/2007 | Tokuno | E01D 19/125 52/318 |
| 2010/0300037 A1 * | 12/2010 | Turner | E04B 1/7654 52/782.1 |
| 2012/0151869 A1 * | 6/2012 | Miller | E04B 1/7666 52/650.1 |
| 2015/0093535 A1 | 4/2015 | Lambach et al. | |
| 2015/0354220 A1 | 12/2015 | Nandi et al. | |

FOREIGN PATENT DOCUMENTS

| | | |
|---|---|---|
| EP | 0006756 A2 | 1/1980 |
| FR | 2636995 A1 | 3/1990 |
| GB | 2082645 A | 3/1982 |
| GB | 2480994 A | 12/2011 |
| JP | 09100584 A | 4/1997 |
| JP | 2003160981 A | 6/2003 |
| JP | 2007056468 A | 3/2007 |
| WO | 9530808 A1 | 11/1995 |
| WO | 0045098 A1 | 8/2000 |
| WO | 2011156460 A2 | 12/2011 |

OTHER PUBLICATIONS

S. C. Mantell et al.; "Manufactured Panelized Roof System for Residential Buildings"; 2008 ACEEE Summer Study on Energy Efficiency in Buildings.

"Reflective Technologies in the Thermal Envelope" by Yarbrough and Hall, Interface (Feb. 2016).

"Roof Framing with Wood I-Joists", Eck, JCL (Jan. 1997).

James L. Lambach et al., U.S. Appl. No. 16/180,632, filed Nov. 5, 2018, entitled Roof Assemblies With Inset Solar Panels, Methods for Their Manufacture, and the Use of Such Assemblies in a Building.

James L. Lambach et al., U.S. Appl. No. 16/180,672, filed Nov. 5, 2018, entitled Buildings With Continous Insulation Bridging a Roof Assembly and a Floor Assembly.

James L. Lambach et al., U.S. Appl. No. 16/180,712, filed Nov. 5, 2018, entitled Floor Assemblies, Methods for Their Manufacture, and the Use of Such Assemblies in a Building.

International Search Report and Written Opinion of the International Searching Authority, PCT/US2019/059588, dated Jan. 23, 2020, Authorized officer: Kim Lien Tran.

* cited by examiner

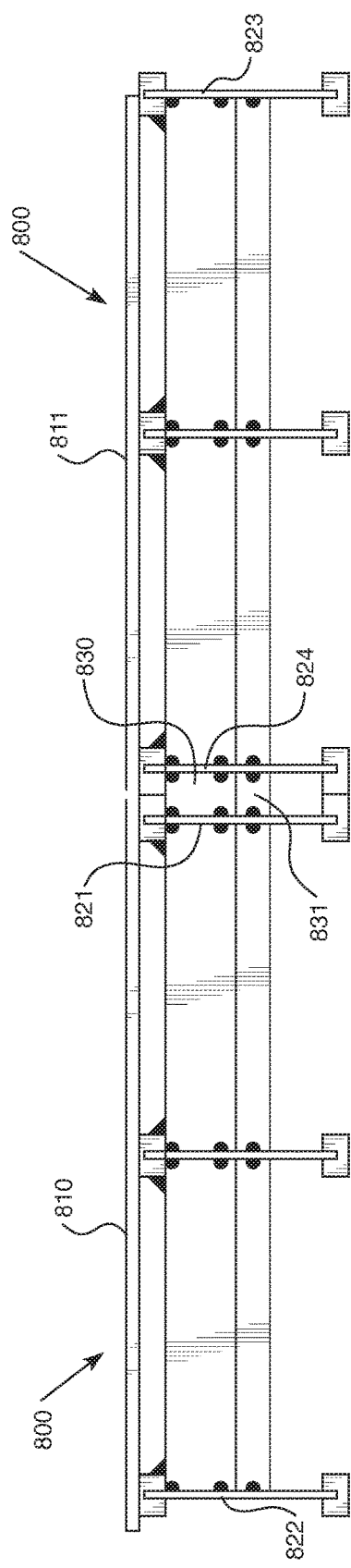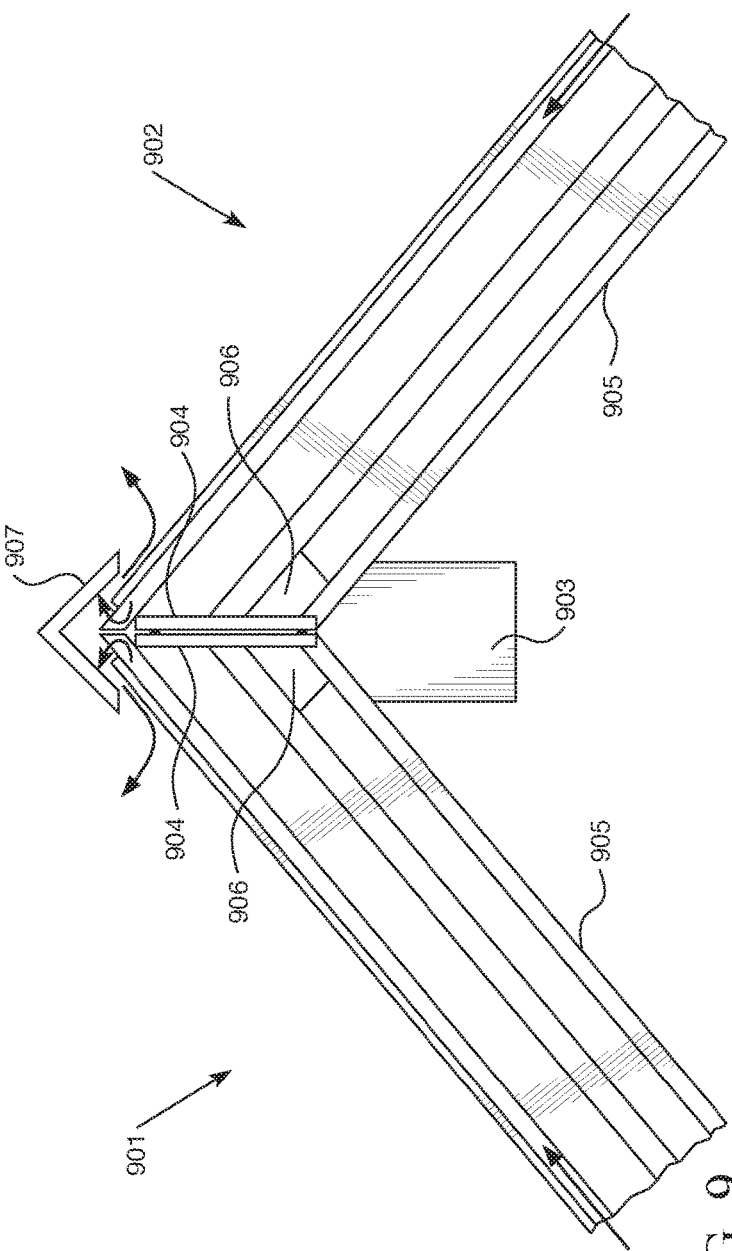
FIG. 8
FIG. 9

ROOF ASSEMBLIES, METHODS FOR THEIR MANUFACTURE, AND THE USE OF SUCH ASSEMBLIES IN A BUILDING

FIELD

The present specification relates to prefabricated insulated roof assemblies that utilize rigid foam insulation boards. The present specification also relates to methods for manufacturing such assemblies, as well as to the use of such assemblies in a building.

BACKGROUND

The building and construction (B&C) segment consumes huge amounts of insulation. Because building codes require significantly more insulation in the attic as compared to elsewhere in the building envelope, residential attic ceilings are the largest insulation application. Currently, low cost fibrous insulations (loose fill fiberglass and cellulose) dominate this application. Of the foam plastics, open cell spray foam comes closest to the cost efficiency of these materials.

Most ceilings have numerous penetrations for light fixtures, utility runs, etc. Since air moves easily through fibrous insulations, the ceiling can be an area of significant energy loss due to conditioned air leakage to the outside environment. Air sealing the penetrations would solve the issue, but it's not easy to do this during the normal sequence of construction.

One approach to make the attic more airtight is to move the insulation boundary from the attic ceiling to the underside of the roof deck, using air impermeable open cell spray foam as the insulation material. The roof deck has fewer penetrations than the ceiling, and spray foam can easily be applied overhead.

This application has made the most inroads in warmer locations where attic insulation requirements are lower. In addition, construction in these markets is often slab-on-grade, which makes locating an HVAC unit in the attic sensible, thereby maximizing valuable living space below. Roof deck insulation creates a more airtight building envelope, and the HVAC unit and ductwork are now located within the conditioned/sealed space, making the operation of the unit more efficient.

This open cell spray application to the underside of the roof deck has grown over the years. However, it is not without its drawbacks. First, open cell spray foam is not a thermal (fire) barrier. Therefore, according to building code, the attic space cannot be used as living space. Second, code will not allow supply/return vents in the attic space unless a thermal barrier is in place. In the summertime the AC unit not only cools the air, it also dehumidifies. If the attic air isn't subject to dehumidification then this space can have a much higher humidity than the living area, leading to concerns about mold and rot in the roof deck.

It would, therefore, be desirable to provide improved insulated assemblies that address these drawbacks of open cell spray foam. Moreover, it would be desirable if such assemblies were capable of efficient prefabrication, thereby reducing onsite labor requirements and having a low total cost of construction. It would further be desirable if such assemblies provide insulation value of at least R-30, or even R-40, while embedding all insulation within the assembly and in which the insulation products used are readily available and are not difficult to manufacture. It would be further desirable have such an assembly that, as constructed, contains a weather-resistive barrier layer, an air barrier layer, a water vapor barrier layer, and thermal insulation layers. Moreover, it would be desirable to have such an assembly that is code compliant as a living and storage space, even without an interior sheathing layer.

The present invention was made in view of the foregoing.

SUMMARY

In certain respects, the specification relates to prefabricated insulated roof assemblies. These assemblies comprise: (a) a sheathing panel comprising: (1) an upper surface, and (2) a lower surface; (b) a plurality of I-joists positioned in a spaced-apart and generally parallel relationship to each other, the I-joists comprising: (1) an upper flange, (2) a lower flange, and (3) a web extending between the upper flange and the lower flange, wherein the lower surface of the sheathing panel abuts an upper surface of the upper flange of the I-joists so that the sheathing panel and the I-joists define a cavity; (c) a generally planar first rigid foam insulation board comprising: (1) an upper surface, (2) a lower surface, (3) a first side, and (4) a second side that is opposite of the first side, wherein first rigid foam insulation board is positioned in the cavity such that: (1) the upper surface of the first rigid foam insulation board faces the lower surface of the upper flange of a first I-joist at the first side of the first rigid foam insulation board, (2) the upper surface of the first rigid foam insulation board faces the lower surface of the upper flange of a second I-joist at the second side of the first rigid foam insulation board, (3) an outer edge of the first side of the first rigid foam insulation board faces the web of the first I-joist, and (4) an outer edge of the second side of the first rigid foam insulation board faces the web of the second I-joist; and (d) a generally planar second rigid foam insulation board comprising: (1) an upper surface, (2) a lower surface, (3) a first side, and (4) a second side that is opposite of the first side, wherein the second rigid foam insulation board is positioned in the cavity such that: (1) the upper surface of the second rigid foam insulation board faces the lower surface of the first rigid foam insulation board, (2) the lower surface of the second rigid foam insulation board faces the upper surface of the lower flange of a first I-joist at the first side of the second rigid foam insulation board, (3) the lower surface of the second rigid foam insulation board faces the upper surface of the lower flange of a second I-joist at the second side of the second rigid foam insulation board, (4) an outer edge of the first side of the second rigid foam insulation board faces the web of the first I-joist, and (5) an outer edge of the second side of the second rigid foam insulation board faces the web of the second I-joist.

In other respects, the present specification is directed to methods for making roof assemblies. These methods comprise: (a) positioning an assembly on a support, the assembly comprising: (1) a first I-joist comprising an upper flange, a lower flange, and a web extending between the upper flange and the lower flange, (2) a second I-joist comprising an upper flange, a lower flange, and a web extending between the upper flange and the lower flange, (3) a generally planar first rigid foam insulation board comprising an upper surface, a lower surface, a first side, and a second side that is opposite of the first side, and (4) a generally planar second rigid foam insulation board comprising an upper surface, a lower surface, a first side, and a second side that is opposite of the first side, wherein: (i) the first I-joist and the second I-joist are positioned in a spaced-apart and generally parallel relationship to each other; (ii) the first rigid foam insulation board and the second rigid foam insulation board are positioned between the first I-joist and the second I-joists; (iii)

the first rigid foam insulation board is positioned between the first I-joist and the second I-joist such that: (A) the upper surface of the first rigid foam insulation board faces the lower surface of the upper flange of a first I-joist at the first side of the first rigid foam insulation board, (B) the upper surface of the first rigid foam insulation board faces the lower surface of the upper flange of a second I-joist at the second side of the first rigid foam insulation board, (C) an outer edge of the first side of the first rigid foam insulation board faces the web of the first I-joist, and (D) an outer edge of the second side of the first rigid foam insulation board faces the web of the second I-joist; and (iv) the second rigid foam insulation board is positioned between the first I-joist and the second I-joist such that: (A) the upper surface of the second rigid foam insulation board faces the lower surface of the first rigid foam insulation board, (B) the lower surface of the second rigid foam insulation board faces the upper surface of the lower flange of a first I-joist at the first side of the second rigid foam insulation board, (C) the lower surface of the second rigid foam insulation board faces the upper surface of the lower flange of a second I-joist at the second side of the second rigid foam insulation board, (D) an outer edge of the first side of the rigid foam insulation board faces the web of the first I-joist, and (E) an outer edge of the second side of the rigid foam insulation board faces the web of the second I-joist; (b) squaring the assembly; and (c) attaching a sheathing panel to the upper surface of the upper flange of the first I-joist and the second I-joist of the squared assembly.

The present specification also relates, among other things, to buildings comprising such roof assemblies described herein.

BRIEF DESCRIPTION OF THE DRAWINGS

Various features and characteristics of the inventions described in this specification may be better understood by reference to the accompanying figures, in which:

FIG. 1b is a detailed elevational view of a portion of the roof assembly of FIG. 1a;

FIG. 8 is a detailed elevational view showing adjacent roof assemblies according to the present specification;

FIG. 9 is a detailed elevational view showing a cathedral roof with a ridge beam and roof assemblies of the present specification;

The reader will appreciate the foregoing features and characteristics, as well as others, upon considering the following detailed description of the inventions according to this specification.

DETAILED DESCRIPTION

The present specification is directed to roof assemblies, methods for their manufacture, and to the use of such assemblies in a building. In certain implementations, the assemblies are "prefabricated" which means that the insulated assembly is manufactured at a facility remote from a building construction site. As such, the amount of work required to install the assembly at the building construction site is significantly reduced relative to roof assemblies that are fabricated at the building construction site, thereby reducing installation costs.

Figure 1A:
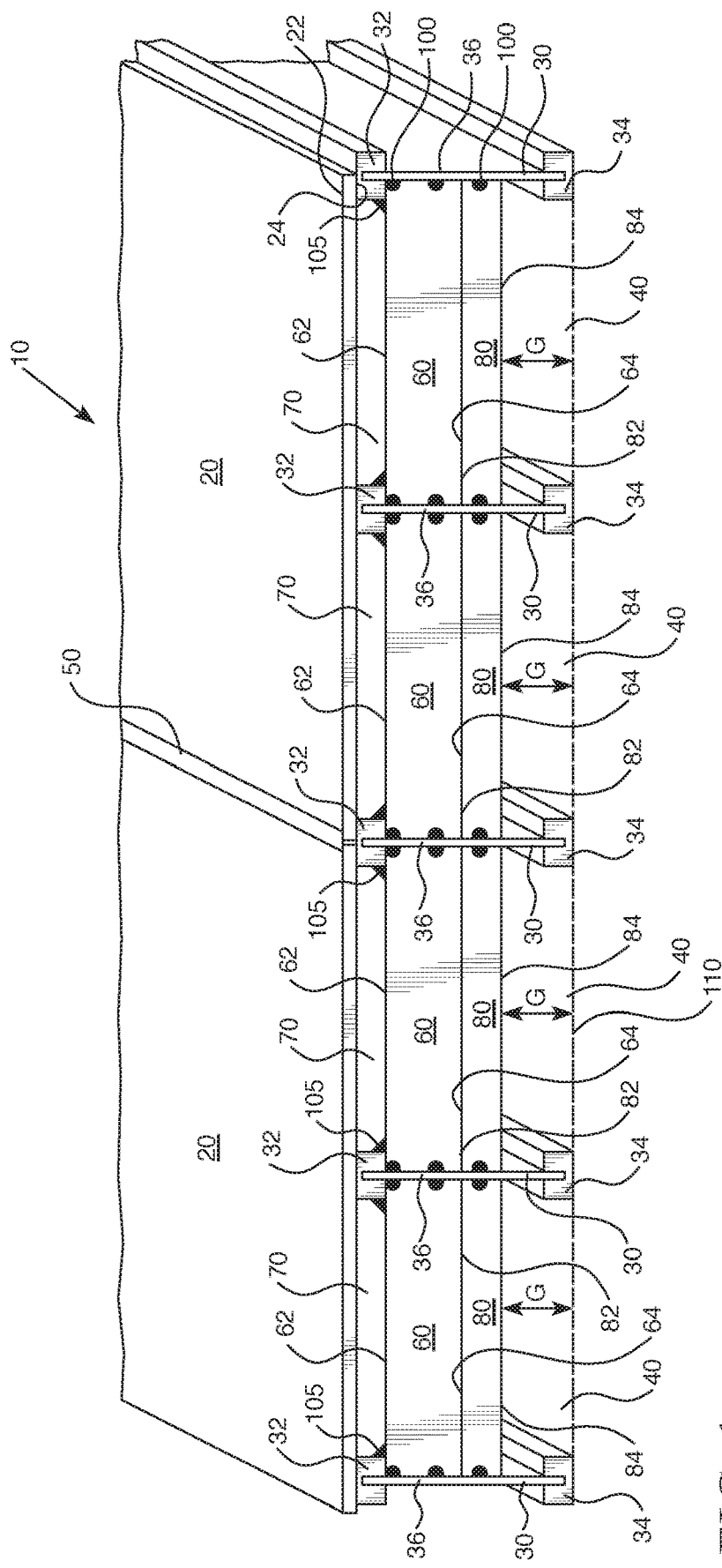
FIG. 1a is a perspective view of a roof assembly according to the present specification.
Figure 1B:
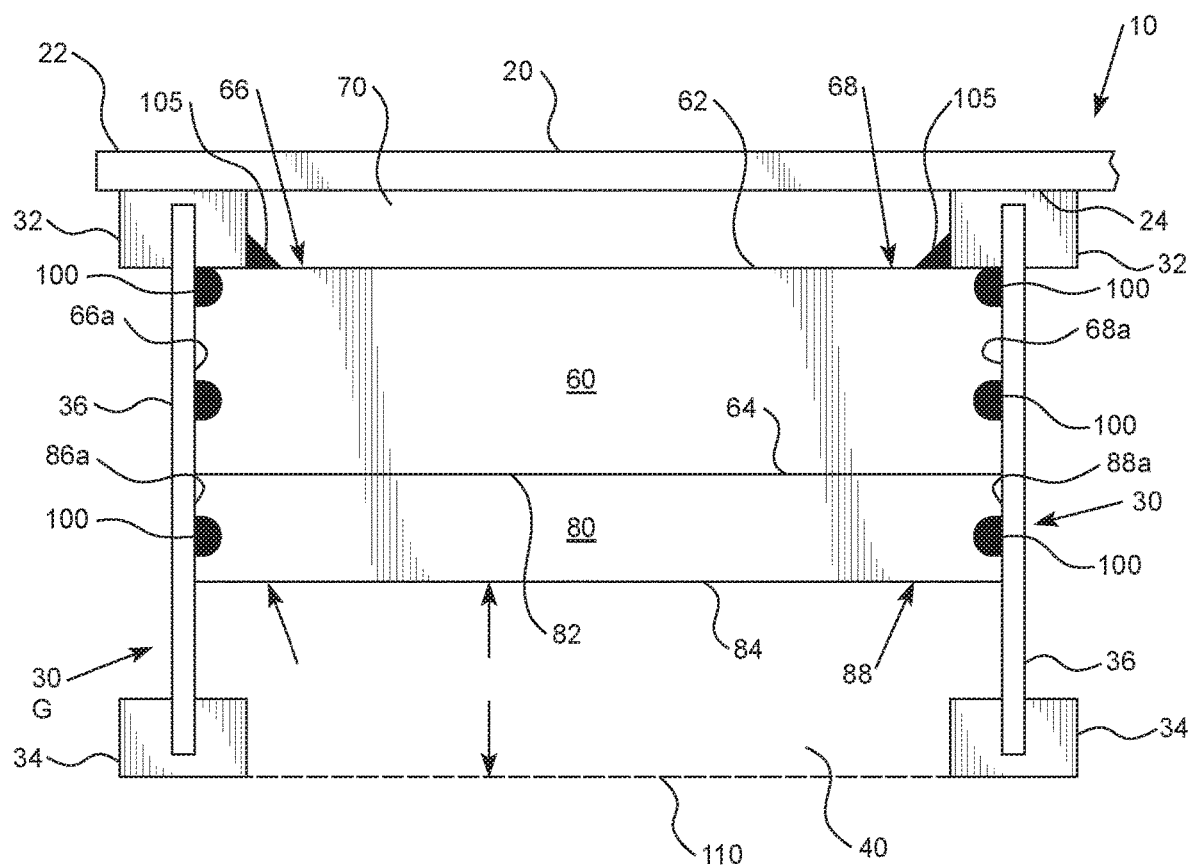

Referring to FIGS. 1a and 1b, a roof assembly 10 comprises a sheathing panel 20. The sheathing panel 20 is of a substantially planar (flat) configuration and is constructed of, for example, oriented strand board ("OSB"), plywood, another type of wood or even a metallic material or composite material. In some cases, the sheathing panel 20 includes an integral weather resistant barrier layer (such as ZIP System™ Roof Sheathing commercially available from Huber Engineered Wood LLC which has an engineered wood structural layer and a phenolic resin-impregnated mat overlaying the wood structural layer on the upper surface of the wood layer). The sheathing panel 20 has an upper surface 22 and a lower surface 24. In some implementations, such as that illustrated in FIGS. 1a and 1b, the sheathing panel 20 has a thickness of ⅜" to ¾", a width of 4 to 10 feet, and length of 15 to 25 feet. As used herein, orientational terms, such as "upper" and "lower" refer to orientation during normal use of the roof assembly.

The roof assembly 10 also includes a plurality of I-joists 30. These joists are elongated beams that support a roof. As is apparent, the I-joists 30 are positioned in a spaced-apart and generally parallel relationship to each other. In some implementations, the spacing between each I-joist is 12 to 36 inches on center, such as 16 to 24 inches on center. Each I-joist comprises (1) an upper flange 32, (2) a lower flange 34, and (3) a web 36 extending between the upper flange 32 and the lower flange 34. The upper flange 32 and the lower flange 34 are often constructed of wood, such as pine lumber and laminated veneer lumber ("LVL"), though other types of wood are also possible, as are metallic and composite materials. In some implementations, the I-joists are constructed using materials that render the I-joists fire retardant.

In some embodiments, the upper flange 32 and the lower flange 34 of the plurality of I-joists 30 has substantially the same width and height dimension. For example, in some cases, upper flange 32 and lower flange 34 have a height of at least 0.5 inch, in some cases, at least 1 inch, such as 1 to 2 inches or 1 to 1½ inches. In some cases, upper flange 32 and lower flange 34 have a width of at least 1¾ inches, such as 2 to 4 inches or 2½ to 3½ inches. The web 36 is often constructed of OSB or plywood, though another type of wood or even a metallic material or composite material could be used if desired. The web 36, in some cases, can be dimensioned so that the I-joist has a total height of 9 to 12 inches, such as 9½ inches to 11⅞ inches. In some cases, web 36 may have holes or other openings that might be utilized as described below.

As is apparent, in the roof assembly 10 depicted in FIGS. 1a and 1b, the lower surface 24 of the sheathing panel 20 abuts an upper surface of the upper flange 32 of the I-joists 30 so that the sheathing panel 20 and the I-joists 30 define cavities 40. In some embodiments, the sheathing panel 20 is secured to the upper surface of the upper flange 32 of the I-joists 30 with adhesive, mechanical fasteners, or a combination thereof. Suitable mechanical fasteners include nails, nail plates, screws, staples, bolts, or rivets, or a combination of any thereof. Attachment adhesives can comprise a construction adhesive that is compatible with the adjoining materials. Suitable adhesives include latex-based adhesives, reactive hot melts, polyester adhesives, polyamide adhesives, acrylic adhesives, one-component epoxy-based adhesives, one-component polyurethane-based adhesives and two-component polyurethane-based adhesives. For example, an adhesive used to attach a sheathing panel to an I-joist can comprise a foam material. Further, as shown in FIG. 1a, tape 50 can be used to seal gaps between adjacent sheathing panels.

Positioned within each cavity 40 is a generally planar first rigid foam insulation board 60. The first rigid foam insulation board comprises: (1) an upper surface 62, (2) a lower surface 64, (3) a first side 66, and (4) a second side 68 that is opposite of the first side. Moreover, the first rigid foam insulation board 60 is positioned in the cavity 40 such that: (1) the upper surface 62 of the first rigid foam insulation board 60 faces the lower surface of the upper flange 32 of a first I-joist 30 at the first side 66 of the first rigid foam insulation board 60, (2) the upper surface 62 of the first rigid foam insulation board 60 faces the lower surface of the upper flange 32 of a second I-joist 30 at the second side 68 of the first rigid foam insulation board 60, (3) an outer edge 66a of the first side 66 of the first rigid foam insulation board 60 faces the web 36 of the first I-joist 30, and (4) an outer edge 68a of the second side 68 of the first rigid foam insulation board 60 faces the web 36 of the second I-joist 30. As a result of this configuration, the roof assembly 10 comprises a ventilation channel 70 having a thickness corresponding to the thickness of the upper flange 32 of the I-joists 30. This ventilation channel can cool the roof and provide drying potential for the sheathing panel 20 in the event that there is a leak of water through the upper side of the sheathing panel 20 which faces the environment. In some of these embodiments, the roof has a minimum pitch of approximately 3/12 to allow the ventilation channel to function properly.

In some implementations, such as is depicted in FIGS. 1a and 1b, the upper surface 62 of the first rigid foam insulation board 60 abuts the lower surface of the upper flange 32 of the first I-joist 30 at the first side 66 of the first rigid foam insulation board 60 and the upper surface 62 of the first rigid foam insulation board 60 abuts the lower surface of the upper flange 32 of the second I-joist 30 at the second side 68 of the first rigid foam insulation board 60 so that first rigid foam insulation board 60 and the upper flanges 32 of the I-joists 30 are not in a spaced-apart relationship relative to each other. In some implementations, an adhesive 100 is disposed between the first rigid foam insulation board 60 and the lower surface of the upper flange 32 of the first I-joist 30 at the first side 66 of the first rigid foam insulation board 60 and/or between the upper surface 62 of the first rigid foam insulation board 60 and the lower surface of the upper flange 32 of the second I-joist 30 at the second side 68 of the first rigid foam insulation board 60. Suitable adhesives include a construction adhesive that is compatible with the adjoining materials, such as the adhesives mentioned earlier. For example, an adhesive used to attach a sheathing panel to an I-joist can comprise a foam material.

As used in this specification, the term "rigid foam insulation board" refers to boards comprising rigid foam, such as, for example, polyisocyanurate (sometimes referred to herein as "polyiso") foam boards, expanded polystyrene foam boards, and extruded polystyrene foam boards. As used herein, "foam" refers to a substance that is formed by trapping pockets of gas in a liquid or solid. In certain embodiments, the foams described in this specification are "closed-cell" foams. The term "closed-cell foam", as used in this specification, means that the foam has a closed cell content of at least 80%, sometimes at least 90%, when measured according to ASTM D6226-15, which is incorporated herein by reference. As indicated, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "board", as used in this specification, refers to a solid, relatively thin and flat slab of material, which in some cases has a rectangular or square shape.

In some embodiments, the first rigid foam insulation board 60 comprises a facer material on the upper face and/or the lower face of the foam layer. In some embodiments, for example, the first rigid foam insulation board 60 may comprise a polyisocyanurate foam layer and a facer material attached to an upper face and/or a lower face of the polyisocyanurate foam layer. A polyisocyanurate board or other type of foam board can comprise a facer material attached to just one face, either the upper face or the lower face, of a polyisocyanurate foam layer or other core foam layer (e.g., expanded polystyrene or extruded polystyrene).

Polyisocyanurate foam boards and other types of foam boards generally comprise a facer material attached to and substantially covering both sides (the upper and lower faces) of a polyisocyanurate foam layer or other core layer. For example, facer materials can comprise glass mats filled with recycled cardpanel and colored with carbon black. Facer materials can also comprise foil or foil/glass composites. Facer materials can also comprise fibrous materials such as fiberglass materials or other fiber-reinforced sheet-like materials. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso foam board or other type of foam board comprises facer materials on both the upper and lower faces of the polyisocyanurate foam layer or other core layer, then the facer material on the upper face may be the same as or may be different than the facer material on the lower face. The facer material should meet the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualify as a water-resistive barrier in accordance with IRC 703.2, which are each incorporated by reference into this specification. For embodiments in which the first rigid foam insulation board comprises a polyiso foam board, the foam board may meet the requirements of ASTM C1289-15: Standard Specification for Faced Rigid Cellular Polyisocyanurate Thermal Insulation Panel, which is incorporated by reference into this specification.

In some implementations, the first rigid foam insulation board 60 has a thickness of at least 2½ inches, such as 2½ inches, 3 inches, 3½ inches, or 4 inches, or any other value from 2½ to 4 inches, and comprises a polyisocyanurate foam layer and an aluminum foil or coated glass facer adhered to each side of the polyisocyanurate foam layer.

As indicated, an outer edge 66a of the first side 66 of the first rigid foam insulation board 60 faces the web 36 of the first I-joist 30 and an outer edge 68a of the second side 68 of the first rigid foam insulation board 68 faces the web 36 of the second I-joist 30. In some implementations, such as the implementation depicted in FIGS. 1a and 1b, edge 66a of the first side 66 of the first rigid foam insulation board 60 abuts the web 36 of the first I-joist 30 and edge 68a of the second side 68 of the first rigid foam insulation board 60 abuts the web 36 of the second I-joist 30, so that edges 66a and 66b are not in a spaced-apart relationship relative to web 36 of the first I-joist 30 and web 36 of the second I-joist 30, respectively.

As indicated earlier, also positioned within each cavity 40 is a generally planar second rigid foam insulation board 80. The second rigid foam insulation board 80 comprises: (1) an upper surface 82, (2) a lower surface 84, (3) a first side 86, and (4) a second side 88 that is opposite of the first side. Moreover, the second rigid foam insulation board 80 is positioned in the cavity 40 such that: (1) the upper surface 82 of the second rigid foam insulation board 80 faces the lower surface 64 of the first rigid foam insulation board 60. In some embodiments, such as is depicted in FIGS. 1a and 1b, the upper surface 82 of the second rigid foam insulation board 80 abuts the lower surface 64 of the first rigid foam insulation board 60 so that first rigid foam insulation board 60 and second rigid foam insulation board 80 are not in a spaced-apart relationship relative to each other. In other embodiments, however, first rigid foam insulation board 60 and second rigid foam insulation board 80 may be placed in a spaced-apart relationship. Such an arrangement could provide an air gap between the first rigid foam insulation board 60 and the second rigid foam insulation board 80 that could further improve the insulation performance of the roof assembly 10. In these embodiments, the distance between the lower surface 64 of the first rigid foam insulation board 60 and the second rigid foam insulation board 80, and hence the height of such an air gap, is, for example, ½ to 6 inches, such as 1 to 3 inches.

Referring still to FIGS. 1a and 1b, it is evident that the lower surface 84 of the second rigid foam insulation board 80 faces the upper surface of the lower flange 34 of a first I-joist 30 at the first side 86 of the second rigid foam insulation board and the lower surface 84 of the second rigid foam insulation board 80 faces the upper surface of the lower flange 34 of a second I-joist 30 at the second side 88 of the second rigid foam insulation board 80. In some embodiments, such as is depicted in FIGS. 1a and 1b, both (i) the lower surface 84 of the second rigid foam insulation board 80 faces the upper surface of the lower flange 34 of a first I-joist 30 at the first side 86 of the second rigid foam insulation board 80 in a spaced-apart relationship relative to each other, and (ii) the lower surface 84 of the second rigid foam insulation board 80 faces the upper surface of the lower flange 34 of a second I-joist 30 at the second side 88 of the second rigid insulation board in a spaced-apart relationship relative to each other. As such, a gap G is formed between the lower surface 84 of the second rigid foam insulation board and the lower surface of the lower flanges 34 of I-joists 30. In some embodiments, such a gap G has a height of, is 1¼ to 7 inches. Gap G can be used to run duct work, electrical lines, and other utilities that can run through cavities 40 using the openings formed in the web 36 of the I-joists 30, as described earlier.

As is also apparent, an outer edge 86a of the second rigid foam insulation board 80 faces the web 36 of the first I-joist 30 at first side 86 and an outer edge 88a of the second rigid foam insulation board 88 faces the web 36 of the second I-joist 30 at second side 88. In some implementations, such as the implementation depicted in FIGS. 1a and 1b, outer edge 86a of the first side 86 of the second rigid foam insulation board 80 abuts the web 36 of the first I-joist 30 and outer edge 88a of the second side 88 of the second rigid foam insulation board 88 abuts the web 36 of the second I-joist 30, so that outer edges 86a and 86b are not in a spaced-apart relationship relative to web 36 of the first I-joist 30 and web 36 of the second I-joist 30, respectively.

In some implementations, the second rigid foam insulation board 80 has a thickness of at least 1½ inches, such as 1½ to 2 inches, and comprises a polyisocyanurate foam layer and a glass fiber reinforced foil (i.e., aluminum foil) facer material adhered to each side of the polyisocyanurate foam layer.

In some implementations, one or more additional insulation layers may be included in the roof assemblies of this specification. For example, it may be desirable to include an insulation layer that has an upper surface that faces the lower surface 84 of the second rigid foam insulation board 80. In one such example, a hybrid roof assembly may be employed that combines rigid foam insulation, such as polyisocyanurate foam insulation boards having an air and vapor impermeable facer, with permeable fiberglass batt insulation. One particular example of such an arrangement is depicted in FIG. 2e, which is described below. Such a hybrid assembly may, for example, provide for improved sound barrier performance. However, when air and vapor permeable insulations, such as fiberglass, are employed, the potential exists for water vapor to condense within the matrix of the permeable insulation. If a mixed permeable, impermeable, insulation approach is used, the designer will typically use a standard such as ASHRAE 160 "Criteria for Moisture-Control Design Analysis in Buildings" to minimize the potential for condensation to occur in the thermal envelope of the building.

In some implementations, an adhesive 100 is disposed in an aperture formed between one or both of the first rigid foam insulation board 60 and a web 36 of an I-joist 30, such as between one or both of edges 66a and 68a of first rigid foam insulation board 60 and web 36 of first I-joist 30 and web 36 of the second I-joist 30 and between one or both of edges 86a and 88a of second rigid foam insulation board 80 and web 36 of first I-joist 30 and web 36 of the second I-joist 30. Suitable adhesives include a construction adhesive that is compatible with the adjoining materials, such as the adhesives mentioned earlier. For example, an adhesive used to attach a sheathing panel to an I-joist can comprise a foam material.

In addition, a sealant 105 may be used to seal edges between I-joists 30 and the upper surface 62 of first rigid foam insulation board 60

In addition, if desired, intermittent blocking or strapping 110 may be attached to the lower flange 34 of I-joists 30, such as at the lower surface of lower flange 34, to provide additional protection against rollover of the assembly 10. In addition to, or in lieu of, blocking or strapping 110, mechanical attachment devices that are specifically designed and sold to stop rollover, such as those sold by Simpson Strong Tie or MiTek/USP or others, can be used.

In certain implementations of the roof assemblies of this specification, the second rigid foam insulation board 80 is designed such that, according to IRC Section 2603.9, compliance with the requirements of IRC Sections 2603.4 through 2603.7 is not required. As will be appreciated based on the IRC, compliance with the requirements of IRC Sections 2603.4 through 2603.7 is not required (allowing the foam plastic to remain exposed) if the end-use assembly is approved in a large scale fire test, such as one of the following: NFPA 286 (using the defined acceptance criteria from IBC Sect 803.1.1.1), FM 4880, UL1040, or UL 1715 in which the testing is on the actual end-use configuration and is performed on the finished manufactured foam plastic assembly in the maximum thickness intended for use.

In addition, in certain implementations of the roof assemblies of this specification, the combined thermal insulating value of the first rigid foam insulation board and the second rigid foam insulation board is at least R-30, in some cases, at least R-40, determined per ASTM C 518-17 in accordance with ASTM C-1289-18.

Various exemplary implementations of the roof assemblies of this specification will now be described with reference to FIGS. 2a-2e. The selection of the particular implementation may be dictated by the climate zone in which the building is located in which the roof assembly is intended to be used as well as structural considerations relating to the building design itself. The implementations may be selected using rigid foam insulation boards that are readily available and are not difficult to manufacture. Such readily available rigid foam insulation boards have a thickness ranging from 1 inch to 4 inch, including thicknesses of 1 inch, 1½ inch, 2 inch, 2½ inch, 3 inch, 3½ inch, and 4 inch.

Figure 2A:
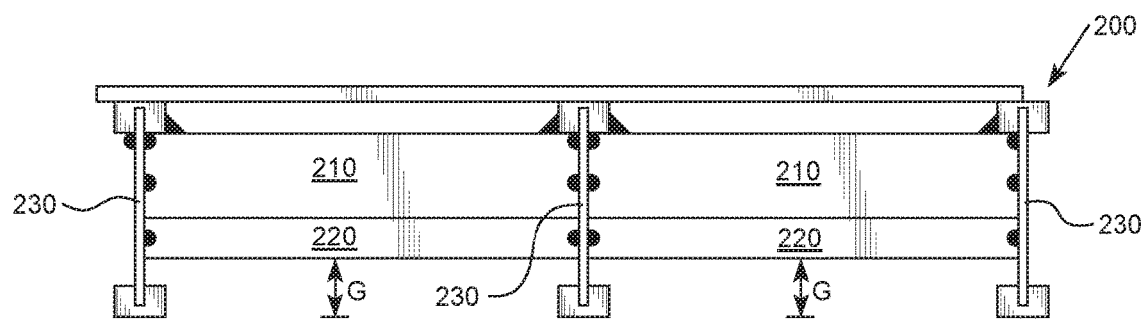
FIGS. 2a-2e are elevational views of various roof assemblies according to the present specification.

For example, FIG. 2a is an exemplary implementation of a roof assembly 200 that might be employed for a building located in United States Climate Zone 4 to 8 (as identified by the United States Department of Energy) in which the use of I-joists 230 having a total height of 9½ inches are illustrated (which may be selected based on structural considerations relating to the building design). In this assembly 200, first rigid foam insulation board 210 may have a thickness sufficient to provide an insulation value of R-27 or greater (determined per ASTM C 518-17 in accordance with ASTM C-1289-18), such as can be the case with a 4 inch thick rigid polyisocyanurate foam board. It may be particularly desirable to employ such a first rigid foam insulation board 210 that comprises a weather impermeable facer material, such as a weather impermeable foil (e.g. aluminum foil) or coated glass facer, adhered to the foam layer on at least the upper side thereof, in some cases on both the upper side and lower side thereof. One specific example of a suitable first rigid foam insulation board 210 that may be employed in such an implementation is 4" thick Xci Foil panels, commercially available from Hunter Panels, Portland, Me. Further, in the implementation depicted in FIG. 2a, second rigid foam insulation board 220 may have a thickness sufficient to provide an insulation value of R-13 or greater (determined per ASTM C 518-17 in accordance with ASTM C-1289-18), such as can be the case with a 2 inch thick rigid polyisocyanurate foam board. It may be particularly desirable to employ such a second rigid foam insulation board 220 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 2" thick Xci 286 panels, commercially available from Hunter Panels, Portland, Me.

Figure 2B:
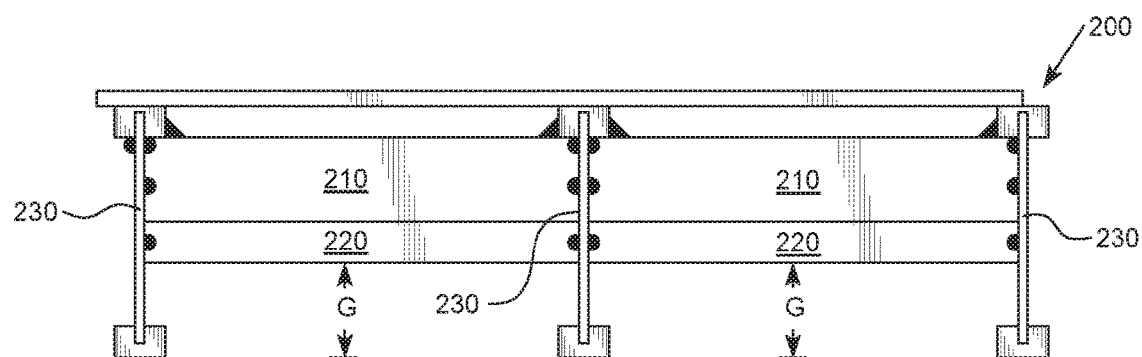

FIG. 2b is another exemplary implementation of a roof assembly 200 that might be employed for a building located in United States Climate Zone 4 to 8 (as identified by the United States Department of Energy). In this case, however, the use of I-joists 230 having a total height of 11⅞ inches is illustrated, which may be selected due to structural considerations relating to the building design. In this assembly 200, the first rigid foam insulation board 210 and second rigid foam insulation board 220 are as described above with respect to FIG. 2a. As is apparent, in this implementation the height of gap G is significantly greater than in the implementation of FIG. 2a.

Figure 2C:
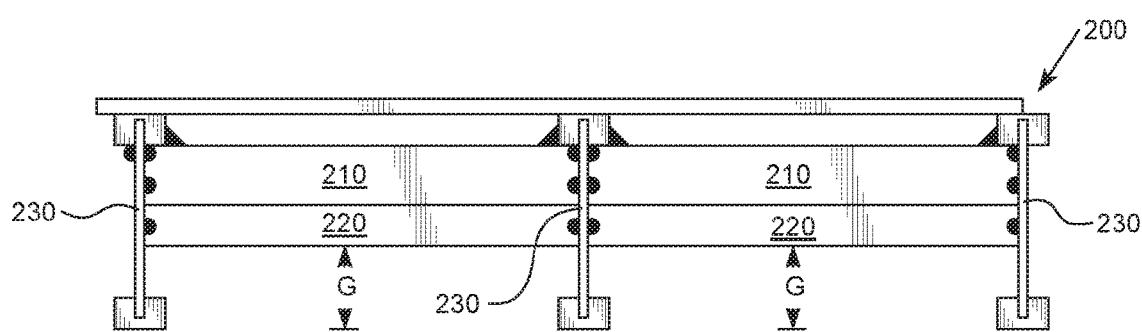

Now referring to FIG. 2c, there is depicted an exemplary implementation of a roof assembly 200 that might be employed for a building located in United States Climate Zone 1 to 3 (as identified by the United States Department of Energy) in which the use of I-joists 230 having a total height of 9½ inches are illustrated (which may be selected based on structural considerations relating to the building design). In this assembly 200, first rigid foam insulation board 210 may have a thickness sufficient to provide an insulation value of R-17 or greater (determined per ASTM C 518-17 in accordance with ASTM C-1289-18), such as can be the case with a 2½ inch thick rigid polyisocyanurate foam board. It may be particularly desirable to employ such a first rigid foam insulation board 210 that comprises a weather impermeable facer material, such as a weather impermeable foil (e.g. aluminum foil) or coated glass facer, adhered to the foam layer on at least the upper side thereof, in some cases on both the upper side and lower side thereof. One specific example of a suitable first rigid foam insulation board 210 that may be employed in such an implementation is 2½" thick Xci Foil panels, commercially available from Hunter Panels, Portland, Me. Further, in the implementation depicted in FIG. 2c, second rigid foam insulation board 220 may have a thickness sufficient to provide an insulation value of R-13 or greater (determined per ASTM C 518-17 in accordance with ASTM C-1289-18), such as can be the case with a 2 inch thick rigid polyisocyanurate foam board. It may be particularly desirable to employ such a second rigid foam insulation board 220 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 2" thick Xci 286 panels, commercially available from Hunter Panels, Portland, Me.

Figure 2D:
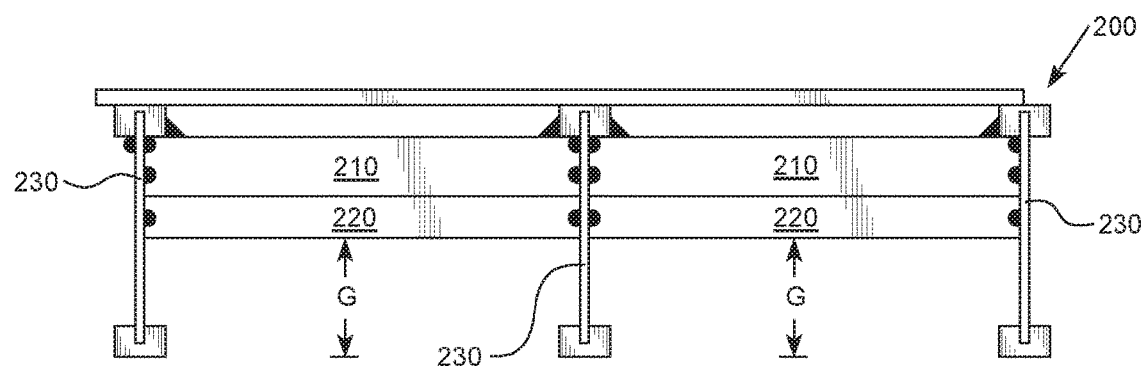
Figure 2E:
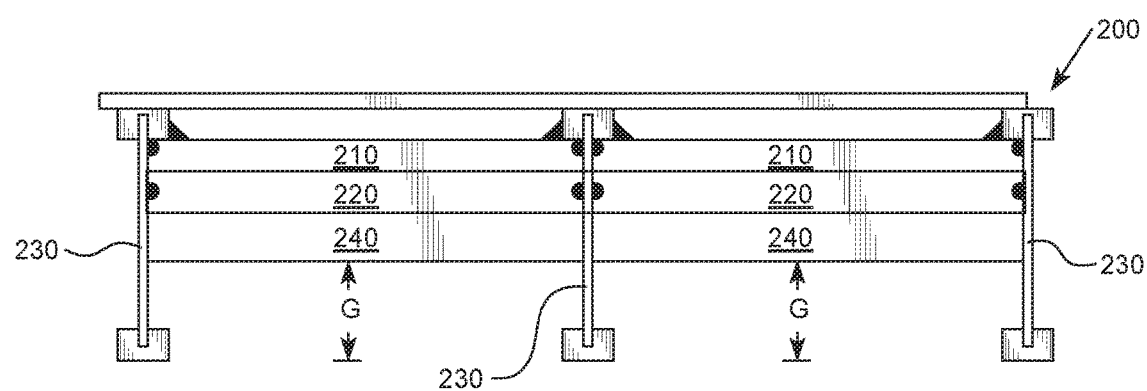

FIG. 2d is another exemplary implementation of a roof assembly 200 that might be employed for a building located in United States Climate Zone 1 to 3 (as identified by the United States Department of Energy). In this case, however, the use of I-joists 230 having a total height of 11⅞ inches is illustrated, which may be selected due to structural considerations relating to the building design. In this assembly 200, the first rigid foam insulation board 210 and second rigid foam insulation board 220 are as described above with respect to FIG. 2c. As is apparent, in this implementation the height of gap G is significantly greater than in the implementation of FIG. 2c.

FIG. 2e is another exemplary implementation of a roof assembly 200 that might be employed for a building located in United States Climate Zone 4 to 8 (as identified by the United States Department of Energy). In this case, the use of I-joists 230 having a total height of 11⅞ inches is illustrated, which may be selected due to structural considerations relating to the building design. In this assembly 200, first rigid foam insulation board 210 may have a thickness sufficient to provide an insulation value of R-10 or greater (determined per ASTM C 518-17 in accordance with ASTM C-1289-18), such as can be the case with a 1½ inch thick rigid polyisocyanurate foam board. It may be particularly desirable to employ such a first rigid foam insulation board 210 that comprises a weather impermeable facer material, such as a weather impermeable foil (e.g. aluminum foil) or coated glass facer, adhered to the foam layer on at least the upper side thereof, in some cases on both the upper side and lower side thereof. One specific example of a suitable first rigid foam insulation board 210 that may be employed in such an implementation is 1½" thick Xci Foil panels, commercially available from Hunter Panels, Portland, Me. Further, in the implementation depicted in FIG. 2e, second rigid foam insulation board 220 may have a thickness sufficient to provide an insulation value of R-13 or greater (determined per ASTM C 518-17 in accordance with ASTM C-1289-18), such as can be the case with a 2 inch thick rigid polyisocyanurate foam board. It may be particularly desirable to employ such a second rigid foam insulation board 220 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 2" thick Xci 286 panels, commercially available from Hunter Panels, Portland, Me. Further, the hybrid assembly 200 depicted in FIG. 2e also includes insulation layer 240 that has an upper surface abutting the lower surface of second rigid foam insulation board 220 and outer edges that face the web of I-joists 230. In this particular implementation, insulation layer 240 is fiberglass batt insulation having a thickness sufficient to provide an insulation value of R-15 or greater (determined per ASTM C 518-17 in accordance with ASTM C-1289-18). As is apparent, in this implementation the height of gap G may be significantly less than in the implementations of FIGS. 2a-2d.

It will be appreciated that various other combinations of rigid foam insulation boards have a thickness ranging from 1 inch to 4 inch, including thicknesses of 1 inch, 1½ inch, 2 inch, 2½ inch, 3 inch, 3½ inch, and 4 inch, maybe employed to achieve the required total insulation level, whether it be R-30, R-40, or some other value (determined per ASTM C 518-17 in accordance with ASTM C-1289-18).

One advantage of the roof assemblies described herein is that it is currently believed that they provide a unique compatibility for insetting solar panels within the roof assembly, thereby avoiding mounting solar panels atop the roof covering as is currently practiced. As a result, in some implementations of the roof assemblies described herein, one or more solar panels is inset within the roof assembly during fabrication. In such an implementation, the solar panel may also function as the primary roof covering, thereby eliminating the need for a typical roof covering in areas where a solar panel is located. The use of such an implementation may be particularly useful in a building design employing a single slope roof instead of a peaked roof. Here, the use of I-joists in the roof assembly, because of their stiffness, is believed to allow a significantly large roof span. By employing a single sloped roof, more solar panels may face the sun (in the northern hemisphere that would be a roof tilting south).

Figure 3:
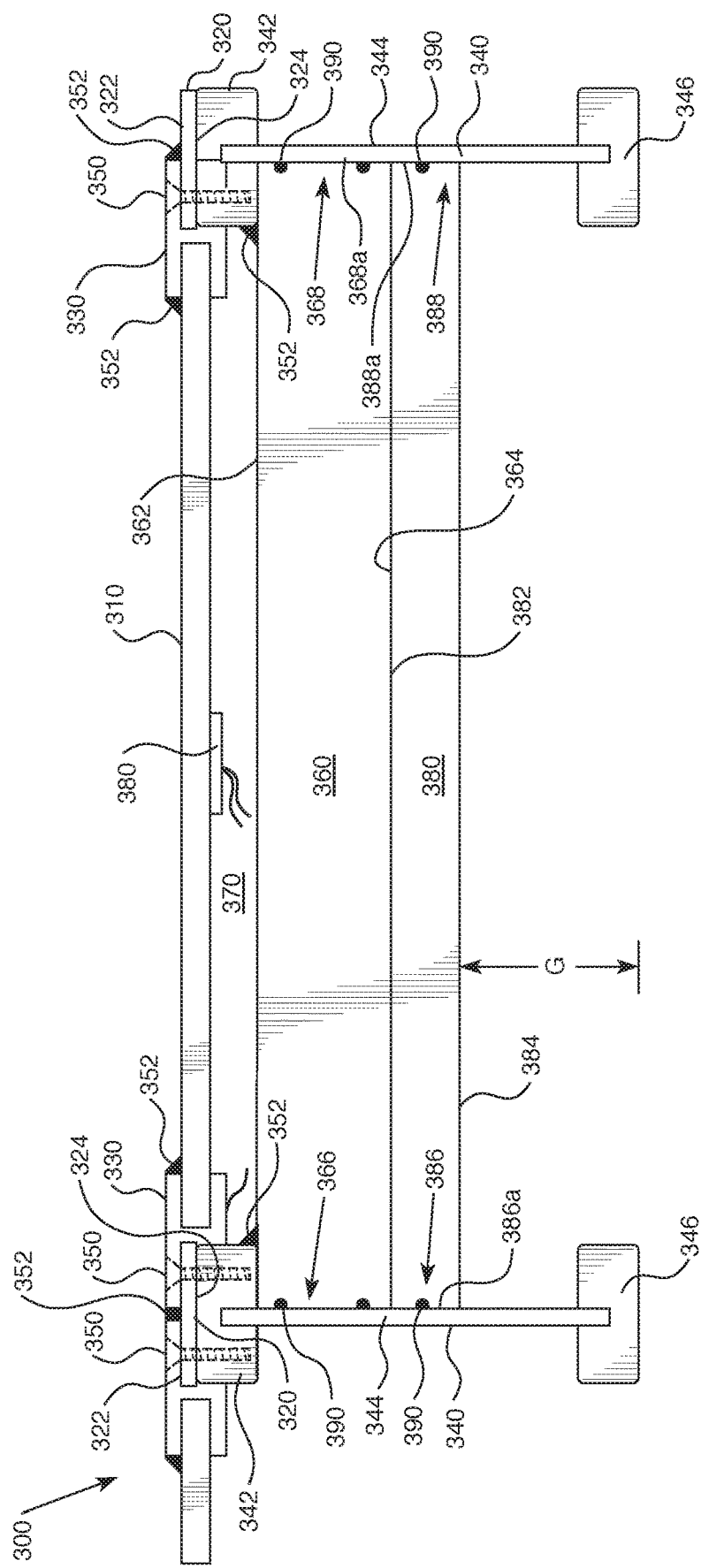
FIG. 3 is an elevational view of a roof assembly according to the present specification in which a solar panel is inset therein.

Referring now to FIG. 3, there is illustrated an implementation of a roof assembly 300 having a solar panel 310 inset therein. In this implementation, sheathing panel 320 is secured to a frame 330 of solar panel 310. Sheathing panel 320 may include any of the sheathing panel materials discussed earlier with respect to FIGS. 1a and 1b, such as OSB, plywood, another type of wood or even a metallic material or composite material and, in some cases, includes an integral weather resistant barrier layer (such as ZIP System™ Roof Sheathing commercially available from Huber Engineered Wood LLC which has an engineered wood structural layer and a phenolic resin-impregnated mat overlaying the wood structural layer on the upper surface of the wood layer).

In some implementations, solar panel 310 is secured to sheathing panel 320 by inserting the solar panel into cutouts formed in the sheathing panel 320 prior to installation of the sheathing panel 320 into assembly 300. The solar panel 310 may be securely attached to sheathing panel 320 through the use of, for example, mechanical fasteners (not shown in FIG. 3). Suitable mechanical fasteners for this purpose include, without limitation, nails, nail plates, screws, staples, bolts, or rivets, or a combination of any thereof. In addition to, or in lieu of, mechanical fasteners, any attachment adhesive, such as any of those mentioned earlier, can be used for this purpose.

The sheathing panel 320 having inset solar panels 310 can then be attached to I-joists 340. In some implementations, the spacing between each I-joist 340 is selected in view of the width of frame 330 of solar panel 310, so that the frame 330 of solar panel 310 partially overlaps with the upper surface of the upper flange 342 of I-joists 340.

As is apparent, in the roof assembly 300 depicted in FIG. 3, the lower surface 322 of the sheathing panel 320 having an inset solar panel 310 abuts an upper surface of the upper flange 342 of the I-joists 340 so that the sheathing panel 320 with inset solar panel 310 and the I-joists 340 define a cavity. In some embodiments, the sheathing panel 320 having inset solar panel 310 is securely attached to the upper surface of upper flange 342 of I-joists 340 through the use of, for example, mechanical fasteners 350. Suitable mechanical fasteners for this purpose include, without limitation, nails, nail plates, screws, staples, bolts, or rivets, or a combination of any thereof. In addition to, or in lieu of, mechanical fasteners, any attachment adhesive, such as any of those mentioned earlier, can be used for this purpose. As shown in FIG. 3, sealant 352 may be applied to seal any gaps at seams between the solar panel 310 and frame 330, between I-joist 340 and first rigid foam insulation board 360 and between frame 330 and sheathing panel 320.

Positioned within the cavity is a generally planar first rigid foam insulation board 360. The first rigid foam insulation board comprises: (1) an upper surface 362, (2) a lower surface 364, (3) a first side 366, and (4) a second side 368 that is opposite of the first side. Moreover, the first rigid foam insulation board 360 is positioned in the cavity such that: (1) the upper surface 362 of the first rigid foam insulation board 360 faces the lower surface of the upper flange 342 of a first I-joist 340 at the first side 366 of the first rigid foam insulation board 360, (2) the upper surface 362 of the first rigid foam insulation board 360 faces the lower surface of the upper flange 342 of a second I-joist 340 at the second side 368 of the first rigid foam insulation board 360, (3) an outer edge 366a of the first side 366 of the first rigid foam insulation board 360 faces the web 344 of the first I-joist 340, and (4) an outer edge 368a of the second side 368 of the first rigid foam insulation board 360 faces the web 344 of the second I-joist 340. As a result of this configuration, the roof assembly comprises a ventilation channel 370 having a thickness corresponding to the thickness of the upper flange of the plurality of I-joists, less the portion of solar panel 310 resting below the upper surface 324 of upper flange 320. This ventilation channel can cool the roof and provide drying potential for the sheathing panel 320 having inset solar panel 310 in the event that there is a leak of water through the upper side of the sheathing panel 320 which faces the environment. In some of these embodiments, the roof has a minimum pitch of approximately ³⁄₁₂ to allow the ventilation channel to function properly. Moreover, ventilation channel 370 provides a convenient location for placement of electrical connections 380 for solar panel 310, as illustrated in FIG. 3.

Suitable first rigid foam insulation boards 360 include any of those discussed above. In some implementations, the first rigid foam insulation board 360 has a thickness of at least 2½ inches, such as 2½ inches, 3 inches, 3½ inches, or 4 inches, or any other value from 2½ to 4 inches, and comprises a polyisocyanurate foam layer and an aluminum foil or coated glass facer adhered to each side of the polyisocyanurate foam layer.

As indicated, an outer edge 366a of the first side 366 of the first rigid foam insulation board 360 faces the web 344 of the first I-joist 340 and an outer edge 368a of the second side 368 of the first rigid foam insulation board 368 faces the web 344 of the second I-joist 340. In some implementations, such as the implementation depicted in FIG. 3, edge 366a of the first side 366 of the first rigid foam insulation board 360 abuts the web 344 of the first I-joist 340 and edge 368a of the second side 368 of the first rigid foam insulation board 368 abuts the web 344 of the second I-joist 340, so that edges 366a and 366b are not in a spaced-apart relationship relative to web 344 of the first I-joist 340 and web 344 of the second I-joist 340, respectively.

Also positioned within the cavity is a generally planar second rigid foam insulation board 380. The second rigid foam insulation board comprises: (1) an upper surface 382, (2) a lower surface 384, (3) a first side 386, and (4) a second side 388 that is opposite of the first side. Moreover, the second rigid foam insulation board 380 is positioned in the cavity such that: (1) the upper surface 382 of the second rigid foam insulation board 380 faces the lower surface 364 of the first rigid foam insulation board 360. In some embodiments, such as is depicted in FIG. 3, the upper surface 382 of the second rigid foam insulation board 380 abuts the lower surface 364 of the first rigid foam insulation board 360 so that first rigid foam insulation board 360 and second rigid foam insulation board 380 are not in a spaced-apart relationship relative to each other. In other embodiments, however, first rigid foam insulation board 360 and second rigid foam insulation board 380 may be placed in a spaced-apart relationship. Such an arrangement could provide an air gap between the first rigid foam insulation board 360 and the second rigid foam insulation board 380 that could further improve the insulation performance of the roof assembly 300. In these embodiments, the distance between the lower surface 364 of the first rigid foam insulation board 360 and the second rigid foam insulation board 380, and hence the height of such an air gap, is, for example, ½ to 6 inches, such as 1 to 3 inches.

Referring still to FIG. 3, it is evident that the lower surface 384 of the second rigid foam insulation board 380 faces the upper surface of the lower flange 346 of a first I-joist 340 at the first side 386 of the second rigid foam insulation board 380 and the lower surface 384 of the second rigid foam insulation board 380 faces the upper surface of the lower flange 346 of a second I-joist 340 at the second side 388 of the second rigid foam insulation board 380. In some embodiments, such as is depicted in FIG. 3, both (i) the lower surface 384 of the second rigid foam insulation board 380 faces the upper surface of the lower flange 346 of a first I-joist 340 at the first side 386 of the second rigid foam insulation board 380 in a spaced-apart relationship relative to each other, and (ii) the lower surface 384 of the second rigid foam insulation board 380 faces the upper surface of the lower flange 346 of a second I-joist 340 at the second side 388 of the second rigid insulation board in a spaced-apart relationship relative to each other. As such, a gap G is formed between the lower surface 384 of the second rigid foam insulation board and the lower surface of lower flanges 346 of I-joists 340. In some embodiments, such a gap G has a height of 1¼ to 7 inches, as described earlier.

As is also apparent, an outer edge 386a of the second rigid foam insulation board 80 faces the web 344 of the first I-joist 340 at first side 386 and an outer edge 388a of the second rigid foam insulation board 388 faces the web 36 of the second I-joist 340 at second side 388. In some implementations, such as the implementation depicted in FIG. 3, outer edge 386a of the first side 386 of the second rigid foam insulation board 380 abuts the web 344 of the first I-joist 340 and outer edge 388a of the second side 388 of the second rigid foam insulation board 388 abuts the web 344 of the second I-joist 340, so that outer edges 386a and 386b are not in a spaced-apart relationship relative to web 344 of the first I-joist 340 and web 344 of the second I-joist 340, respectively.

In some implementations, the second rigid foam insulation board 380 has a thickness of at least 1½ inches, such as 1½ to 2 inches, and comprises a polyisocyanurate foam layer and a glass fiber reinforced foil (i.e., aluminum foil) facer material adhered to each side of the polyisocyanurate foam layer.

In some implementations, an adhesive 390 is disposed in an aperture formed between one or both of the first rigid foam insulation board 360 and a web 344 of an I-joist 340, such as between one or both of edges 366a and 368a of first rigid foam insulation board 360 and web 344 of first I-joist 340 and web 344 of the second I-joist 340 and between one or both of edges 386a and 388a of second rigid foam insulation board 380 and web 344 of first I-joist 340 and web 344 of the second I-joist 340. Suitable adhesives include any of the construction adhesives mentioned earlier. In addition, if desired, intermittent blocking or strapping may be attached to the lower flange 346 of I-joists 340, such as at the lower surface of lower flange 346, to provide additional protection against rollover of the assembly 300.

Further, in certain implementations of such the roof assemblies, the second rigid foam insulation board 380 is designed such that, according to IRC Section 2603.9, compliance with the requirements of IRC Sections 2603.4 through 2603.7 is not required. As will be appreciated based on the IRC, compliance with the requirements of IRC Sections 2603.4 through 2603.7 is not required (allowing the foam plastic to remain exposed) if the end-use assembly is approved in a large scale fire test, such as one of the following: NFPA 286 (using the defined acceptance criteria from IBC Sect 803.1.1.1), FM 4880, UL1040, or UL 1715 in which the testing is on the actual end-use configuration and is performed on the finished manufactured foam plastic assembly in the maximum thickness intended for use.

In addition, in certain implementations of such the roof assemblies, the combined thermal insulating value of the first rigid foam insulation board 360 and the second rigid foam insulation board 380 is at least R-30, in some cases, at least R-40, determined per ASTM C 518-17 in accordance with ASTM C-1289-18.

Figure 4:
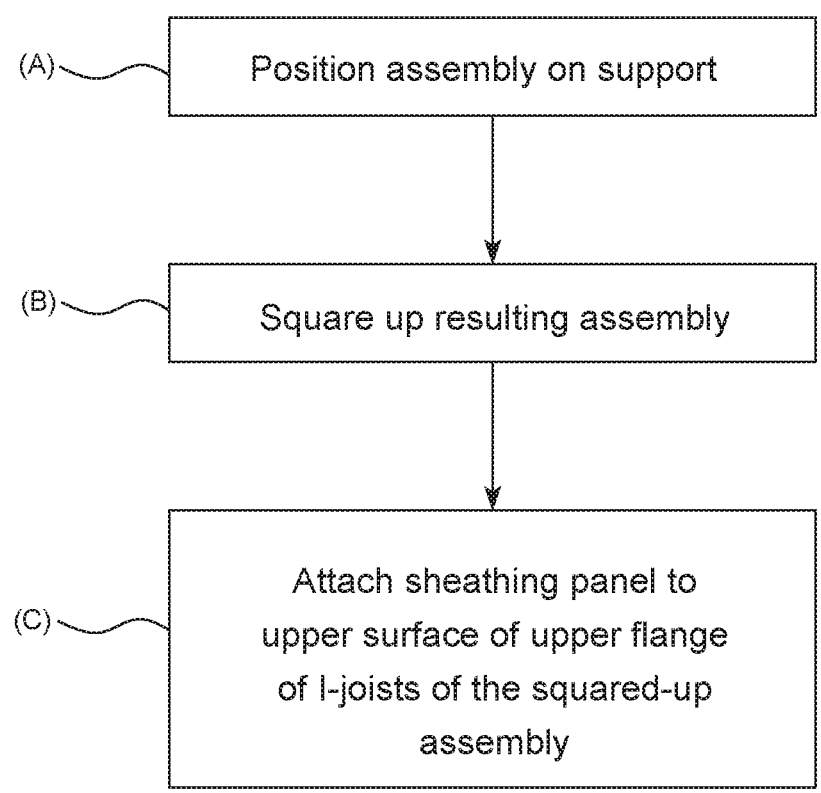
FIG. 4 is a flow chart of a method for making roof assemblies of the present specification.

This specification is also directed to methods for making the roof assemblies described above. Referring now to FIG. 4, the methods comprise (a) positioning an assembly on a support. The assembly comprises: (1) a first I-joist comprising an upper flange, a lower flange, and a web extending between the upper flange and the lower flange, (2) a second I-joist comprising an upper flange, a lower flange, and a web extending between the upper flange and the lower flange, (3) a generally planar first rigid foam insulation board comprising an upper surface, a lower surface, a first side, and a second side that is opposite of the first side, and (4) a generally planar second rigid foam insulation board comprising an upper surface, a lower surface, a first side, and a second side that is opposite of the first side, wherein: (i) the first I-joist and the second I-joist are positioned in a spaced-apart and generally parallel relationship to each other; (ii) the first rigid foam insulation board and the second rigid foam insulation board are positioned between the first I-joist and the second I-joists; (iii) the first rigid foam insulation board is positioned between the first I-joist and the second I-joist such that: (A) the upper surface of the first rigid foam insulation board faces the lower surface of the upper flange of a first I-joist at the first side of the first rigid foam insulation board, (B) the upper surface of the first rigid foam insulation board faces the lower surface of the upper flange of a second I-joist at the second side of the first rigid foam insulation board, (C) an outer edge of the first side of the first rigid foam insulation board faces the web of the first I-joist, and (D) an outer edge of the second side of the first rigid foam insulation board faces the web of the second I-joist; and (iv) the second rigid foam insulation board is positioned between the first I-joist and the second I-joist such that: (A) the upper surface of the second rigid foam insulation board faces the lower surface of the first rigid foam insulation board, (B) the lower surface of the second rigid foam insulation board faces the upper surface of the lower flange of a first I-joist at the first side of the second rigid foam insulation board, (C) the lower surface of the second rigid foam insulation board faces the upper surface of the lower flange of a second I-joist at the second side of the second rigid foam insulation board, (D) an outer edge of the first side of the rigid foam insulation board faces the web of the first I-joist, and (E) an outer edge of the second side of the rigid foam insulation board faces the web of the second I-joist; (b) squaring the assembly; and (c) attaching a sheathing panel to the upper surface of the upper flange of the first I-joist and the second I-joist of the squared assembly.

As used herein, "generally parallel" means not only that the longest dimension of the I-joists are in an exact parallel relationship to one another but also encompasses situations in which the longest dimension of the I-joists are not in a perfectly parallel relationship, such as where the deviation from perfectly parallel is 10° or less, such as 5° or less, though it will be appreciated that in many cases it may be preferred to minimize such a deviation as much as is practically possible.

A particular implementation of the fabrication method will now be described with reference to FIGS. 5 and 6. In this implementation, the step of positioning the assembly on the support comprises: (1) placing the first I-joist 500 on the support surface 525; (2) positioning the first rigid foam insulation board 550 and the second rigid foam insulation board 555 against the first I-joist 500 such that: (i) the upper surface of the second rigid foam insulation board 555 faces the lower surface of the first rigid foam insulation board 550, (ii) the upper surface of the first rigid foam insulation board 550 faces the lower surface of the upper flange of the first I-joist 500 at the first side of the first rigid foam insulation board 550, (iii) the outer edge of the first side of the first rigid foam insulation board 550 faces the web of the first I-joist, (iv) the lower surface of the second rigid foam insulation board 555 faces the upper surface of the lower flange of the first I-joist 500 at the first side of the second rigid foam insulation board 555, and (v) the outer edge of the first side of the second rigid foam insulation board 555 faces the web of the first I-joist 500; and (3) positioning the second I-joist 505 against the first rigid foam insulation board 550 and the second rigid foam insulation board 555 such that: (i) the upper surface of the first rigid foam insulation board 550 faces the lower surface of the upper flange of the second I-joist 505 at the second side of the first rigid foam insulation board 550, (ii) the outer edge of the second side of the first rigid foam insulation board 550 faces the web of the second I-joist 505, (iii) the lower surface of the second rigid foam insulation board 555 faces the upper surface of the lower flange of a second I-joist 505 at the second side of the second rigid foam insulation board 555, and (iv) the outer edge of the second side of the second rigid foam insulation board 555 faces the web of the second I-joist 505.

The procedure described in the immediately preceding paragraph may be continued until the desired size of the roof assembly has been achieved. For example, in the particular implementation depicted in FIGS. 5 and 6, the step of positioning the assembly on the support further comprises: (4) positioning rigid foam insulation board 551 and rigid foam insulation board 556 against the I-joist 505 such that: (i) the upper surface of rigid foam insulation board 551 faces the lower surface of rigid foam insulation board 556, (ii) the upper surface of rigid foam insulation board 551 faces the lower surface of the upper flange of I-joist 505 at the first side of rigid foam insulation board 551, (iii) the outer edge of the first side of rigid foam insulation board 551 faces the web of I-joist 505, (iv) the lower surface of rigid foam insulation board 556 faces the upper surface of the lower flange of I-joist 505 at the first side of rigid foam insulation board 556, and (v) the outer edge of the first side of rigid foam insulation board 556 faces the web of I-joist 505; (5) positioning I-joist 510 against rigid foam insulation board 551 and rigid foam insulation board 556 such that: (i) the upper surface of rigid foam insulation board 551 faces the lower surface of the upper flange of I-joist 510 at the second side of the first rigid foam insulation board 551, (ii) the outer edge of the second side of rigid foam insulation board 551 faces the web of I-joist 510; (iii) the lower surface of rigid foam insulation board 556 faces the upper surface of the lower flange of I-joist 510 at the second side of rigid foam insulation board 556, and (iv) the outer edge of the second side of rigid foam insulation board 556 faces the web of I-joist 510; (6) positioning rigid foam insulation board 552 and rigid foam insulation board 557 against the I-joist 510 such that: (i) the upper surface of rigid foam insulation board 552 faces the lower surface of rigid foam insulation board 557, (ii) the upper surface of rigid foam insulation board 552 faces the lower surface of the upper flange of I-joist 510 at the first side of rigid foam insulation board 552, (iii) the outer edge of the first side of rigid foam insulation board 552 faces the web of I-joist 510, (iv) the lower surface of rigid foam insulation board 557 faces the upper surface of the lower flange of I-joist 510 at the first side of rigid foam insulation board 557, and (v) the outer edge of the first side of rigid foam insulation board 557 faces the web of I-joist 510; (7) positioning I-joist 515 against rigid foam insulation board 552 and rigid foam insulation board 557 such that: (i) the upper surface of rigid foam insulation board 552 faces the lower surface of the upper flange of I-joist 515 at the second side of the first rigid foam insulation board 552, (ii) the outer edge of the second side of rigid foam insulation board 552 faces the web of I-joist 515; (iii) the lower surface of rigid foam insulation board 557 faces the upper surface of the lower flange of I-joist 515 at the second side of rigid foam insulation board 557, and (iv) the outer edge of the second side of rigid foam insulation board 557 faces the web of I-joist 515; (8) positioning rigid foam insulation board 553 and rigid foam insulation board 558 against the I-joist 515 such that: (i) the upper surface of rigid foam insulation board 553 faces the lower surface of rigid foam insulation board 558, (ii) the upper surface of rigid foam insulation board 553 faces the lower surface of the upper flange of I-joist 515 at the first side of rigid foam insulation board 553, (iii) the outer edge of the first side of rigid foam insulation board 553 faces the web of I-joist 515, (iv) the lower surface of rigid foam insulation board 558 faces the upper surface of the lower flange of I-joist 515 at the first side of rigid foam insulation board 558, and (v) the outer edge of the first side of rigid foam insulation board 558 faces the web of I-joist 515; and (9) positioning I-joist 520 against rigid foam insulation board 553 and rigid foam insulation board 558 such that: (i) the upper surface of rigid foam insulation board 553 faces the lower surface of the upper flange of I-joist 520 at the second side of the first rigid foam insulation board 553, (ii) the outer edge of the second side of rigid foam insulation board 553 faces the web of I-joist 520; (iii) the lower surface of rigid foam insulation board 558 faces the upper surface of the lower flange of I-joist 520 at the second side of rigid foam insulation board 558, and (iv) the outer edge of the second side of rigid foam insulation board 558 faces the web of I-joist 520.

In some implementations, locator means, such as one or more plates, bars, or pins can be used to maintain proper spacing between I-joists as well as to ensure that the I-joists are kept square. In the particular implementation illustrated in FIGS. 5 and 6, for example, a combination of intermediate spacing bars 530, 531, and 532, fixed end positioning plate 535, and sliding compression plate 540 are used to ensure proper alignment of the I-joists 500, 505, 510, 515, and 520 in a generally parallel relationship to one another and to ensure proper spacing between I-joists 500, 505, 510, 515, and 520 by placing the respective I-joists against such locator means during fabrication of the assembly.

In some implementations, an adhesive (such as those described earlier) may be applied between the web of the I-joists and the rigid foam insulation boards. By way of illustration, in the particular implementation depicted in FIGS. 5 and 6, adhesive 545 is applied between the web of I-joists 500 and 505 and outer edges of rigid foam insulation boards 550 and 555, between the web of I-joists 505 and 510 and outer edges of rigid foam insulation boards 551 and 556, between the web of I-joists 510 and 515 and outer edges of rigid foam insulation boards 552 and 557, and between the web of I-joists 515 and 520 and outer edges of rigid foam insulation boards 553 and 558. Such application of adhesive 545 may be accomplished by applying adhesive 545 to I-joist webs prior to insertion of the rigid foam insulation board between I-joists or, alternatively, may be accomplished by applying adhesive to the outer edges of the rigid foam insulation boards prior to their installation, or both. Such adhesive 545 can be applied to the I-joist web before or after the I-joist is placed into position on support surface 525. The use of such an adhesive is believed to add to the structural integrity of the assembly, especially with regard to rollover, while also creating an air barrier between the inside surface of the panels and the exterior.

In some implementations of the fabrication methods described herein, a support may be used to aid in positioning of the first rigid foam insulation board and the second rigid foam insulation board. Referring still to FIGS. 5 and 6, it is seen that, in this particular implementation, support 560 aids in positioning of first rigid foam insulation board 550 and second rigid foam insulation board 555. First rigid foam insulation board 550 and second rigid foam insulation board 555 may be placed on support 560 either simultaneously or they may be positioned sequentially atop the support 560 (with first rigid foam insulation board 550 lying atop second rigid foam insulation board 555). In some implementations, as shown in the implementation illustrated in FIGS. 5 and 6, the lower surface of first rigid foam insulation board 550 abuts the upper surface of the second rigid foam insulation board 555 so that rigid foam insulation board 550 is not in a spaced-apart relationship to second rigid foam insulation board 555. In these implementations, an adhesive may be applied where the lower surface of first rigid foam insulation board 550 abuts the upper surface of the second rigid foam insulation board 555. The adhesive may be applied prior to positioning the first rigid foam insulation board 550 and second rigid foam insulation board 555 on support 560 when such rigid foam insulation boards are being positioned simultaneously. When being positioned sequentially, such an adhesive could be applied, for example, to the upper surface of second rigid foam insulation board 555 after such insulation board is positioned on support 560 and prior to positioning of first rigid foam insulation board 550 atop second rigid foam insulation board 555. If it is desired for an air gap to exist between lower surface of first rigid foam insulation board 550 and upper surface of the second rigid foam insulation board so that rigid foam insulation board 550 is in a spaced-apart relationship to second rigid foam insulation board 555, then a spacer, such as a block made of, for example, foam board, wood, or any other appropriate material, may be used.

Figure 5:
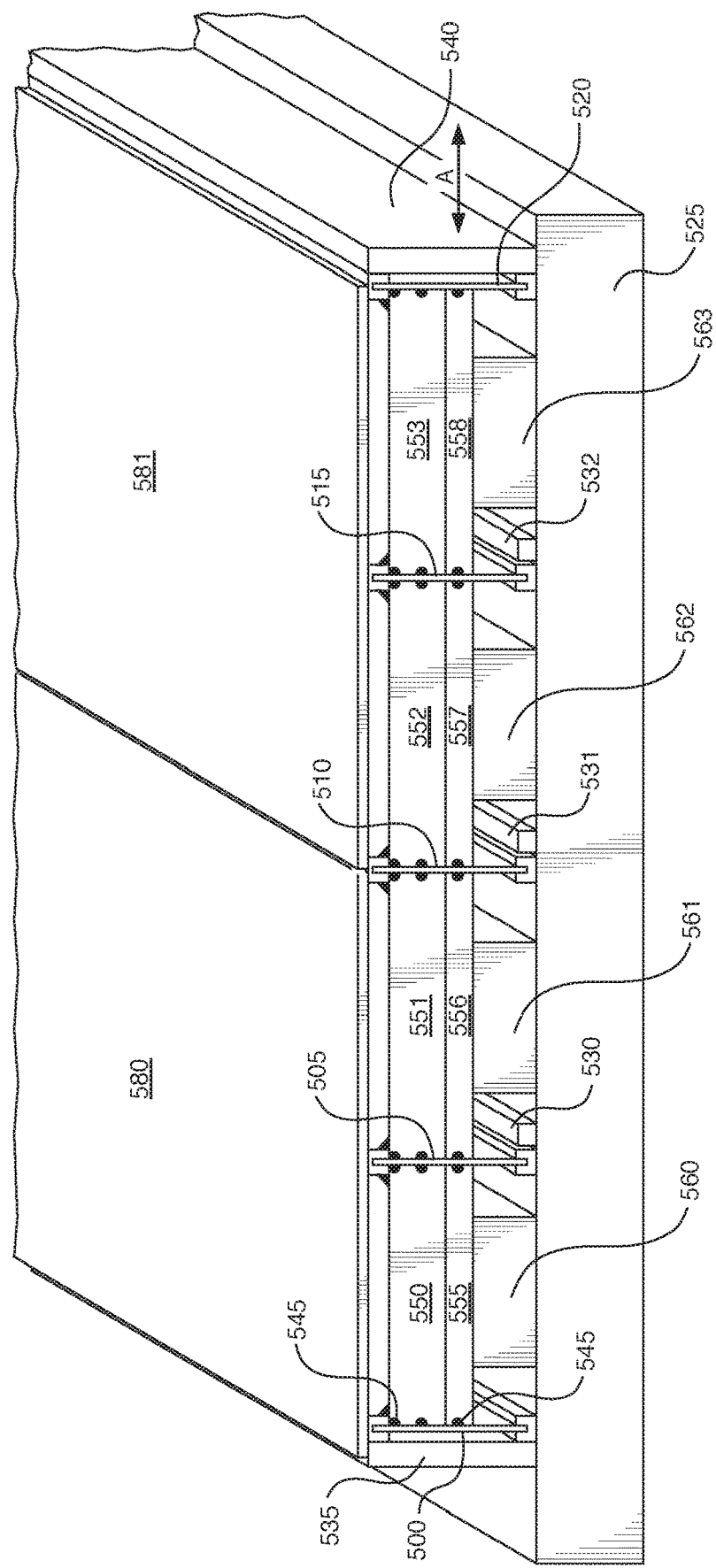
FIG. 5 is a perspective view of a roof assembly placed on a support surface during assembly thereof.
Figure 6:
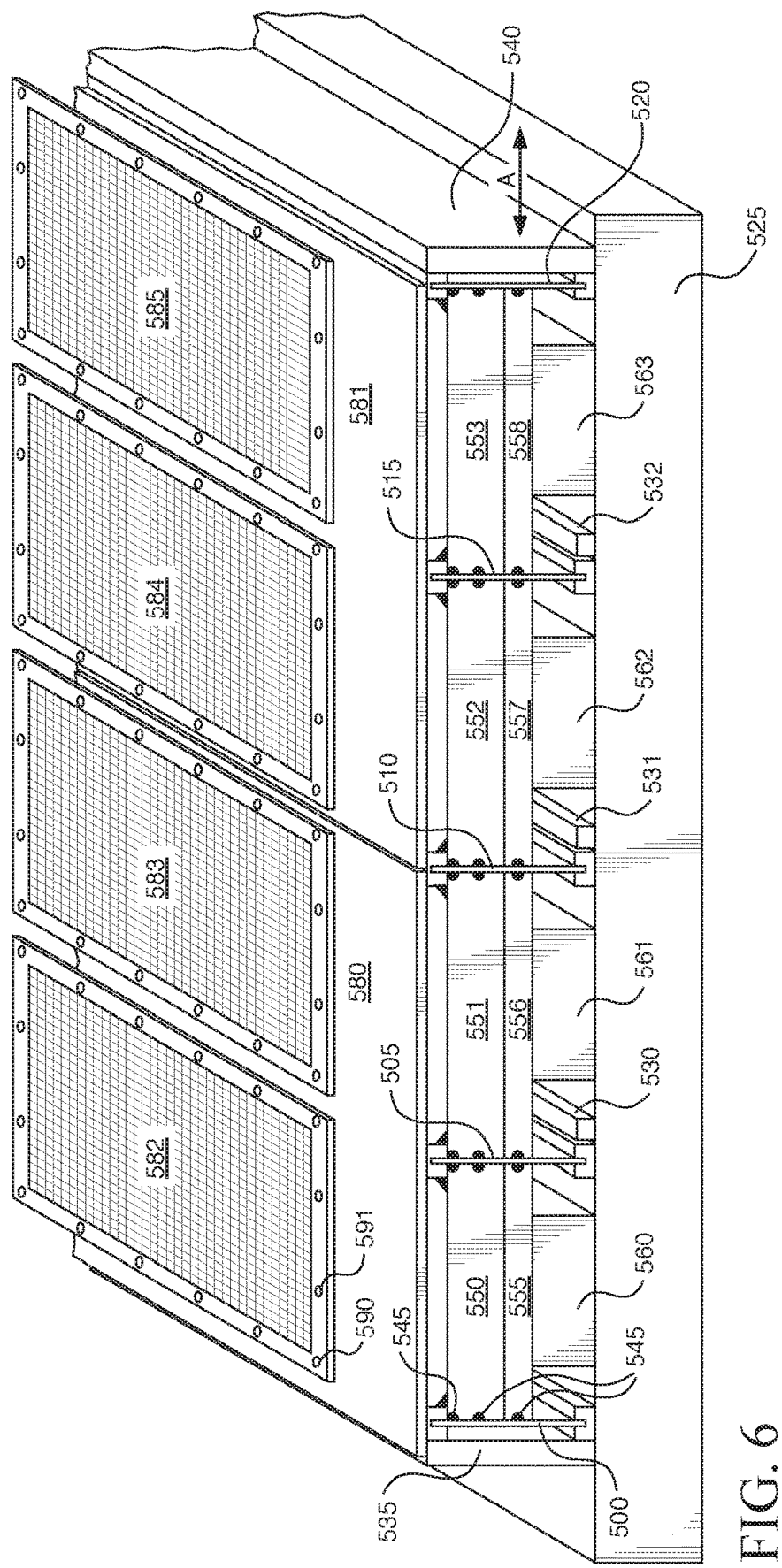
FIG. 6 is a perspective view of a roof assembly having inset solar panels that is placed on a support during assembly thereof.

Similarly, in the implementation illustrated in FIGS. 5 and 6, support 561 aids in positioning of first rigid foam insulation board 551 and second rigid foam insulation board 556, support 562 aids in positioning of first rigid foam insulation board 552 and second rigid foam insulation board 557, and support 563 aids in positioning of first rigid foam insulation board 553 and second rigid foam insulation board 558, each in the manner described earlier with respect to support 560, first rigid foam insulation board 550 and second rigid foam insulation board 555.

In some implementations, the supports can be dimensioned based on the thickness of the rigid foam insulation boards, the height of the I-joists, and the desired distance, if any, between the lower surface of the respective second rigid foam insulation board and the lower surface of the lower flange of the respective I-joist. In some embodiments, the supports are dimensioned so that the distance between the lower surface of the sides of the respective second rigid foam insulation board and the lower surface of the lower flange of the respective I-joist is 1¼ to 7 inches. Supports 560, 561, 562, and 563 can be designed to be adjustable to provide for various height dimensions.

According to the fabrication methods of this specification, (B) the assembly is then squared. According to the depicted implementation of the fabrication method in FIGS. 5 and 6, when the final assembled sections are in place, an adjustable squaring means, such as a sliding compression plate 540 or sliding bars or pins, which slides in the direction of arrow A, is used to position the end I-joist 520 so as to square up the assembly prior to attaching sheathing panels 580, 581 to the I-joists. The sheathing panels 580, 581 are then (C) attached using an adhesive and/or mechanical fasteners, such as nails, nail plates, screws, staples, bolts, or rivets, or a combination of any thereof. Any of the attachment adhesives can be used if desired. A tape (not shown in FIGS. 5 and 6) can be used to seal gaps between adjacent sheathing panels 580, 581. If tape is desired to be resistant to water penetration then it will typically conform to the AAMA-711 specification.

As is seen in FIG. 6, the sheathing panels 580, 581 may comprise inset solar panels 582, 583, 584, and 585, which may be inset into sheathing panels 580, 581 using mechanical fasteners 590, 591 as described above with respect to FIG. 3.

As illustrated in the implementation depicted in FIGS. 5 and 6, adjacent sheathing panels 580, 581 can, if desired, be attached to the I-joists 500, 505, 510, 515, and 520 such that an end of adjacent sheathing panels 580, 581 are attached to the same I-joist. Here, it is seen that sheathing panel 580 is attached to I-joist 500 such that a portion of the sheathing panel 580 extends laterally beyond the edge of upper flange of I-joist 500 and is attached to I-joist 510 such that a portion of the upper flange of I-joist 515 extends laterally beyond the edge of sheathing panel 580. Sheathing panel 581 is attached to I-joist 515 at the portion of the upper flange of I-joist 515 that is not covered by sheathing panel 580, usually with a small gap, such as about ⅛", between sheathing panel 581 and sheathing panel 580, and is attached to I-joist 520 such that a portion of the upper flange of I-joist 515 extends laterally beyond the edge of sheathing panel 581.

Figure 7:
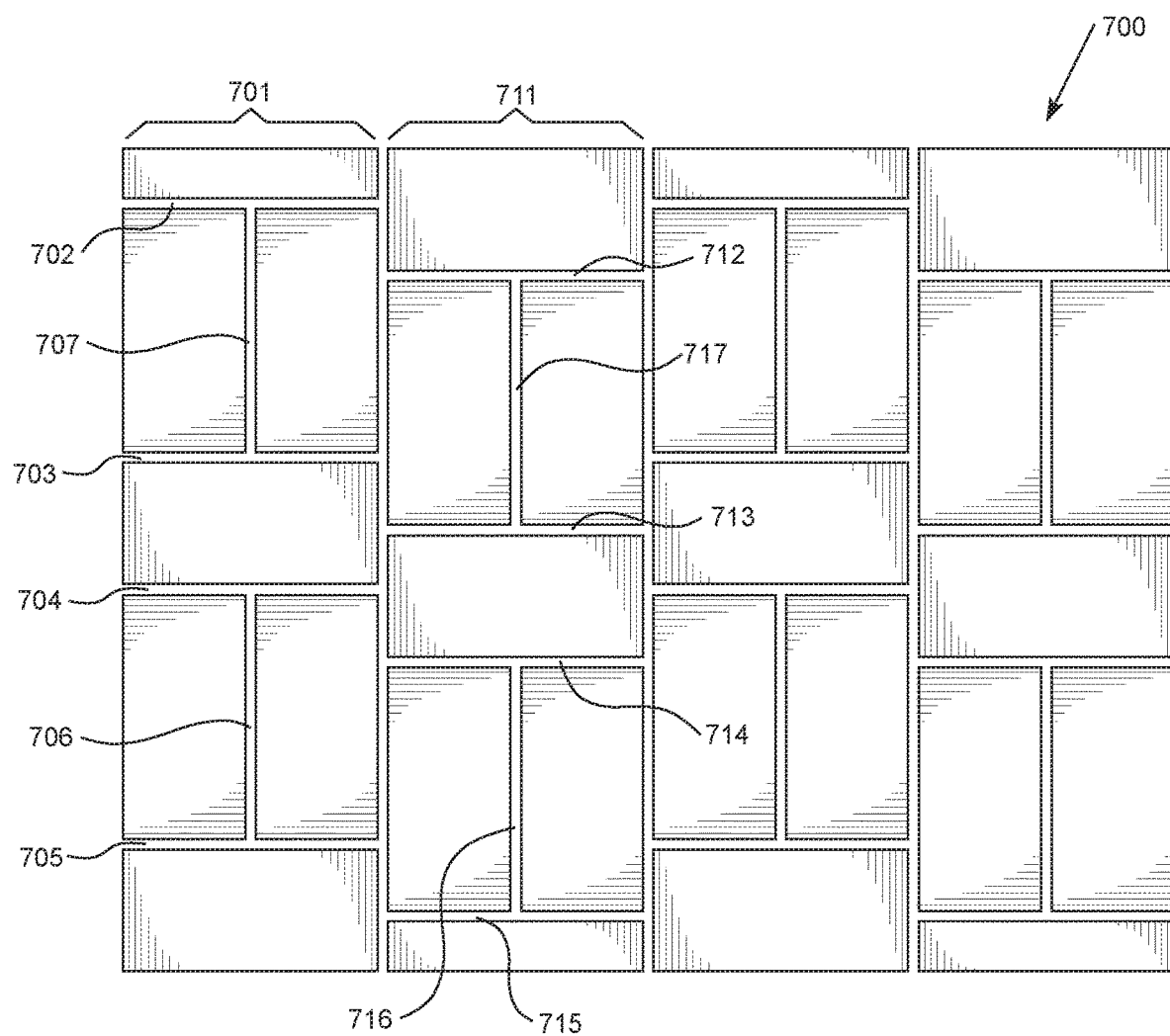
FIG. 7 is a top view of an arrangement of multiple roof panels of the present specification that provides a staggered seem orientation.

Now referring to FIG. 7, it is seen that, in some implementations, the roof assemblies described in this specification may be designed so that seams between sheathing panels may be staggered and may be oriented in different directions. As shown by the top view of FIG. 7, panel 701 of the assembly 700 comprises seams 702, 703, 704, and 705 and seams 706, 707 that are oriented in a direction perpendicular to seams 702, 703, 704, and 705. In addition, seems 712, 713, 714, and 715 on panel 711 are staggered relative to seams 702, 703, 704, and 705 on panel 701 and seams 716, 717 on panel 711 are staggered relative to seams 706, 707 on panel 701. The use of such staggered seams can increase the strength of the roof assembly by eliminating edge-runs.

FIG. 8 illustrates, in a detailed elevation view, an arrangement of adjacent roof assemblies 800 of this specification. In the implementation depicted in FIG. 8, the sheathing panels 810, 811 are attached to the I-joists such that an end of adjacent sheathing panels 810, 811 are attached to the same I-joist 821. Here, it is seen that sheathing panel 810 is attached to end I-joist 822 such that a portion of the sheathing panel 810 extends laterally beyond the edge of upper flange of I-joist 822 and is attached to I-joist 821 such that a portion of the upper flange of I-joist 821 extends laterally beyond the edge of sheathing panel 810. Sheathing panel 811 is attached to I-joist 821 at the portion of the upper flange of I-joist 821 that is not covered by sheathing panel 810 and is attached to I-joist 823 such that a portion of the upper flange of I-joist 823 extends laterally beyond the edge of sheathing panel 811. Moreover, sheathing panel 811 is attached to I-joist 824 such that a portion of the sheathing panel 811 extends laterally beyond the edge of upper flange of I-joist 824 so that when the end of sheathing panel 811 is attached to the upper flange of I-joist 821, I-joist 821 and I-joist 824 are in close proximity to each other, and, in some cases, abut one another. If desired, first rigid foam insulation insert 830 and/or second rigid foam insulation insert 831 may be disposed in between adjacent I-joists 821 and 824 so that thermal bridging occurs only through the webs of the I-joists, thereby rendering the assembly a pseudo continuous insulation assembly. First rigid foam insulation insert 830 and/or second rigid foam insulation insert 831 may be any of the rigid foam insulation boards described earlier, or may be another foam material.

Some embodiments of this specification relate to buildings that comprise the roof assemblies described herein. For example, FIG. 9 illustrates use of roof assemblies as described herein in a cathedral roof arrangement. Here, assemblies 901, 902 are supported by ridge beam 903. End blocking 904, typically made of solid wood, OSB, or plywood, may span between the ends of spaced-apart generally parallel arranged I-joists 905 to resist against rollover. Joist hangers (not shown) may also be employed. A web stiffener 906, typically made of solid wood, OSB, or plywood, can be used to span the web of the I-joists 905. A ventilated ridge cap 907 may cover the ends of assemblies 901, 902 where they meet at the apex of the cathedral roof. Metal strapping (not shown) may also be included at intervals across butted tops of I-joists of each assembly 901, 902. Ventilation channels provide for air flow in the direction of the arrows.

Figure 10:
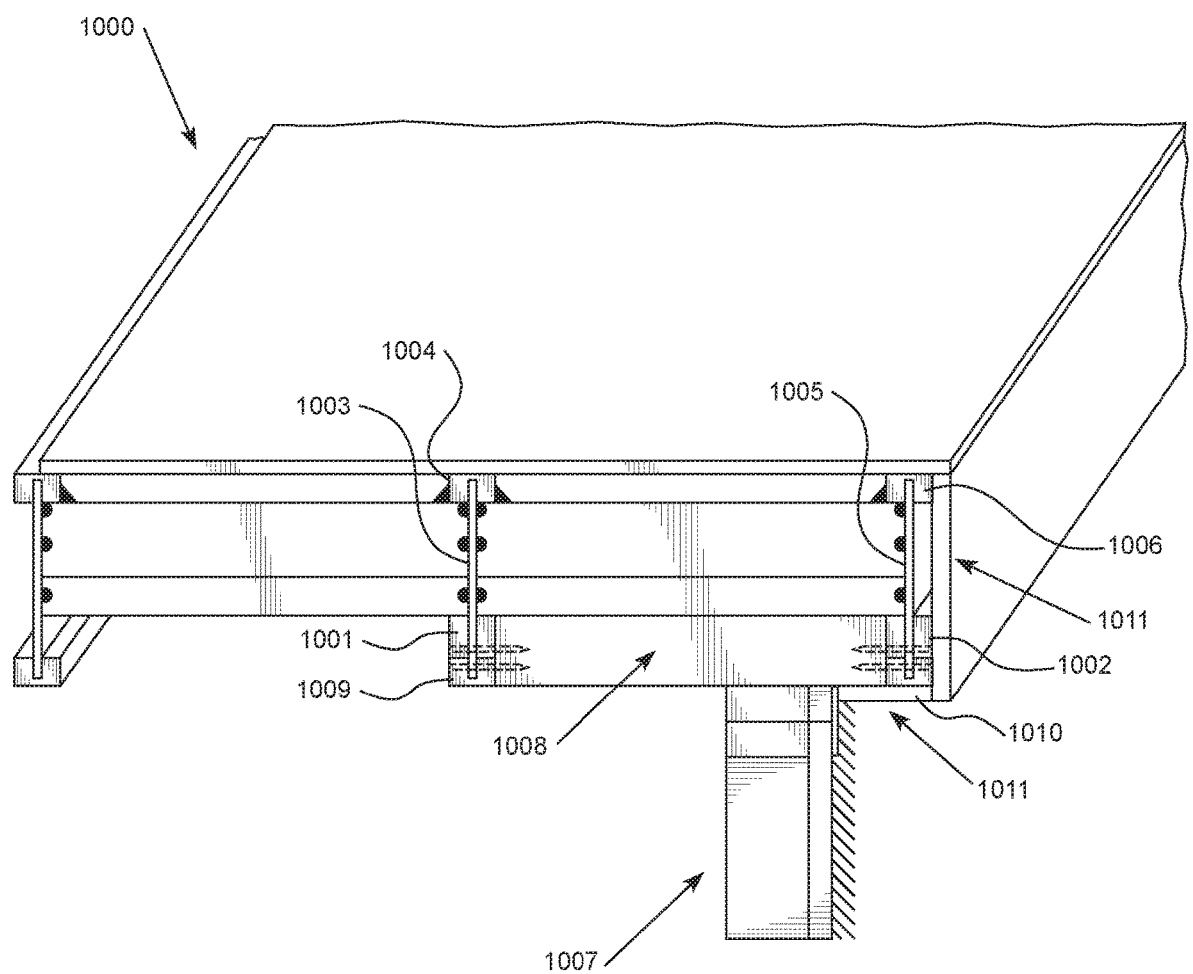
FIG. 10 is a perspective view illustrating a roof assembly of the present specification having an end thereof over a wall assembly in a gable end overhang.

FIG. 10 illustrates a roof assembly of the present specification having an end thereof over a wall assembly in a gable end overhang. Here, assembly 1000 includes backing blocks 1001, 1002, typically made of solid wood, plywood, or OSB, attached to web 1003 of I-joist 1004 and to web 1005 of I-joist 1006 that overhangs wall structure 1007. A blocker board 1008, typically made of solid wood, OSB, or plywood, may span from backer block 1001 and lower flange 1009 to backer block 1002 and lower flange 1010. The backer board 1008 may provide support to the gable end overhang. Fascia 1011 may cover I-joist 1006 and the portion of backer board 1008 that forms part of the overhang.

Any of a variety of wall structures 1007 may be suitable for use in such an arrangement. In some implementations, however, the wall structure is a foam wall structure that comprises: a) a frame comprising: a first member; a second member spaced apart from the first member; and two side members extending between the first and second members, wherein the first member, second member, and two side members each have a front surface and a rear surface that form the front frame surface and the rear frame surface of the frame; b) at least one primary support member positioned between the two side members and extending between the first and second member, wherein the primary support member defines a front primary support surface and an opposite rear primary support surface corresponding to the front frame surface and rear frame surface; c) a slab of rigid foam insulation board, such as a faced polyisocyanurate board, attached to one of at least a portion of the front frame surface or at least a portion of the front primary support surface and optionally the front primary support surface of the at least one primary support members, such that the rigid foam insulation board, the first and second members, the two side members and the at least one primary support members define one or more voids within the frame; d) a foam layer received within at least a portion of one of the voids within the frame, wherein the foam layer adheres to at least a portion of the rigid foam insulation board. As used in this specification, the term "front", when used with reference to a wall structure, refers to the side, face, or surface of the structure or component thereof that is oriented towards the outside direction of an exterior wall of a building, and the term "rear" refers to the side, face, or surface of a structure or component thereof oriented towards the inside direction of an exterior wall of a building.

In such wall structures 1007, the primary support members, side members, first member, and/or second member may comprise one or more plates, boards, beams, or the like. For example, as shown in FIG. 10, the first member may include two top plates.

In such wall structures 1007, the two side members and/or primary support members are fixedly engaged to the first member and second member, often with mechanical fasteners, such as nails, staples, bolts, screws, and rivets, and can be constructed of various materials, such as wood, metal, fiberglass, plastic, or a combination thereof.

In addition, the dimensions of the first member, second member, two side members, and primary support members can vary depending on the intended use of the wall structure 1007. In some implementations, they each have a width and height dimension of nominally 2×4 inches or nominally 2×6 inches.

As indicated, in certain embodiments of such wall structures 1007, the rigid foam insulation board is a slab of polyiso foam board attached to at least a portion of the front frame surface. By "polyiso foam board" (or PIR) it is meant a sheet or slab or section of polyisocyanurate-modified polyurethane foam. Suitable polyiso foam boards include those discussed earlier with respect to the roof assemblies described herein. The polyiso board may be attached to the front frame surface by various means. In one implementation, the polyiso foam board is attached to the front frame surface by mechanical fasteners, such as nails, staples or screws. Alternatively, the polyiso foam board may be attached to the front frame surface by the use of one or more adhesives, such as latex-based adhesives, reactive hot melts, polyester adhesives, polyamide adhesives, acrylic adhesives, one-component epoxy-based adhesives, one-component polyurethane-based adhesives and two-component polyurethane-based adhesives. A foam material may be used as the adhesive. In this embodiment, a thin layer of foam may be applied to the polyiso foam board, the front frame surface, or both before adhering the polyiso foam board to the front frame surface.

Certain implementations of wall structure 1007 include a foam material deposited into the frame to form a foam layer. Non-limiting examples of suitable foam material that can be used include materials made with polyurethane, polyisocyanurate (also referred to as polyiso), and mixtures thereof. In some embodiments, the foam material may be substantially free, may be essentially free, and may be completely free of halogen containing flame retardant additives. In some cases, the foam material can be deposited into the frame such that the foam material forms a foam layer within at least a portion of the frame between the front frame surface and the rear frame surface and adheres to the rigid foam insulation board. In some cases, the foam layer is dimensioned to expand to a position intermediate the front frame surface and rear frame surface, thereby forming a gap or opening within the foam wall structure between the foam layer and the rear frame surface. This gap can be used as an area to incorporate home utility components such as electrical wires, cords, heating and cooling pipes, and plumbing fixtures. These home utility components may be inserted into the gap located between the foam layer and the rear frame surface such that utilities components are not surrounded or contacting the foam layer, in certain embodiments, the gap comprises at least two inches as measured between the foam layer and the rear frame surface.

In some implementations, the foam layer has a relatively high density. More particularly, in certain implementations, the density of the foam layer is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08. In some implementations, foam layer is formed by spraying foam-forming components into the frame.

Further, the foam layer can be formed in-situ during the manufacturing process. The term "formed in-situ during the manufacturing process" refers to the formation of a foam layer during manufacturing of the foam wall structure off-site at a facility remote or away from a building construction site. The foam layer can provides structural stability to the foam wall structure 1007 such as improved wall racking strength, which refers to the ability of a wall structure to maintain its shape under duress.

Suitable wall structures, as well as methods for producing them, are described in United States Patent Application Publication No. 2015/0093535 A1, which is incorporated herein by reference.

Figure 11:
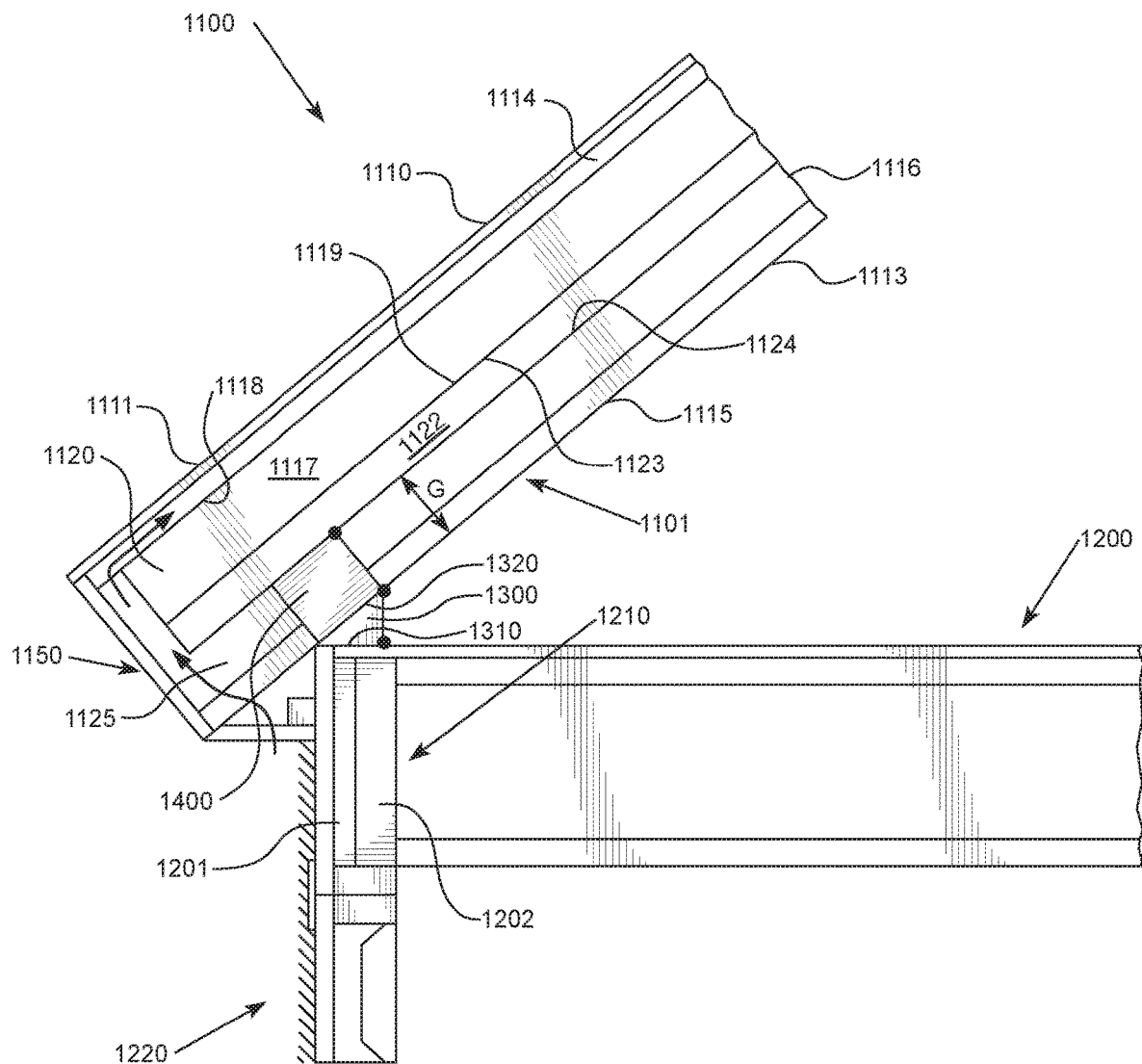
FIG. 11 is a detailed elevational view showing a roof assembly/floor joist combination arrangement according to the present specification.

FIG. 11 illustrates a building comprising a roof panel to floor joist connection assembly 1100 according to some implementations. Here, the building comprises (1) a sloped prefabricated insulated roof assembly 1101, (2) a generally horizontally arranged flooring assembly 1200 comprising an end 1210 thereof that is arranged over a wall assembly 1220 and wherein an end of the sloped roof assembly 1101 overhangs the end 1210 of the flooring assembly 1200 that is arranged over the wall assembly, (3) a sloped member 1300 arranged over the end 1210 of the flooring assembly 1200 that is over the wall assembly 1220, and (4) a rigid foam insulation member 1400 arranged in a cavity of the roof assembly 1101 so as to bridge a lower surface of a rigid foam insulation board in the roof assembly to the sloped member 1300.

As indicated, the foregoing building comprising a roof panel to floor joist connection assembly 1100 comprises a prefabricated insulated roof assembly 1101. This prefabricated insulated roof assembly 1101 can be any of the roof assemblies described earlier in this specification.

In particular, the roof assembly 1101 comprises a sheathing panel 1110. The sheathing panel 1110 comprises an upper surface 1111 and a lower surface 1112. The sheathing panel 1100 is of a substantially planar (flat) configuration and is constructed of, for example, OSB, plywood, another type of wood or even a metallic material or composite material. In some cases, the sheathing panel 1110 includes an integral weather resistant barrier layer (such as ZIP System™ Roof Sheathing commercially available from Huber Engineered Wood LLC which has an engineered wood structural layer and a phenolic resin-impregnated mat overlaying the wood structural layer on the upper surface of the wood layer). In some implementations, the sheathing panel 1100 has a thickness of ⅜ inch to ¾ inch, a width of 4 to 10 feet, and length of 15 to 25 feet. The sheathing panel 1110 may include an inset solar panel, as described earlier in this specification.

The sloped roof assembly 1101 also comprises a plurality of I-joists 1113. The I-joists 1113 are positioned in a spaced-apart generally parallel relationship to each other. The I-joists 1113 comprise: (i) an upper flange 1114, (ii) a lower flange 1115, and (iii) a web 1116 extending between the upper flange 1114 and the lower flange 1115. In some implementations, the spacing between each I-joist 1113 is 12 to 36 inches on center, such as 16 to 24 inches on center. The upper flange 1114 and the lower flange 1115 of I-joists 1113 are often constructed of wood, such as pine lumber and LVL, though other types of wood are also possible, as are metallic and composite materials. In some embodiments, the upper flange 1114 and the lower flange 1115 of the I-joists 1113 have substantially the same width and height dimension. For example, in some cases, upper flange 1114 and lower flange 1115 have a height of at least 0.5 inch, in some cases, at least 1 inch, such as 1 to 2 inches or 1 to 1½ inches. In some cases, upper flange 1114 and lower flange 1115 have a width of at least 2 inches, such as 2 to 4 inches or 2½ to 3½ inches. The web 1116 is often constructed of OSB or plywood, though another type of wood or even a metallic material or composite material could be used if desired. The web 1116, in some cases, can be dimensioned so that the I-joist has a total height of 9 to 12 inches, such as 9½ inches to 11⅞ inches.

In the sloped roof assembly 1101, a lower surface of the sheathing panel 1110 faces an upper surface of the upper flange 1114 of the I-joists 1115 so that the sheathing panel 1110 and the I-joists 1113 define a cavity.

The sloped roof assembly 1101 further includes a generally planar rigid foam insulation board. In the particular implementation depicted in FIG. 11, the sloped roof assembly includes a first rigid foam insulation board 1117 and a second rigid foam insulation board 1122 positioned in the cavity. In this implementation, first rigid foam insulation board 1117 comprises: (i) an upper surface 1118, (ii) a lower surface 1119, (iii) a first side 1120, and (iv) a second side (not shown) that is opposite of the first side. Moreover, first rigid foam insulation board 1117 is positioned in the cavity such that: (1) the upper surface 1118 of first rigid foam insulation board 1117 faces the lower surface of the upper flange 1114 of a first I-joist 1113 at the first side 1120 of first rigid foam insulation board 1117, (2) the upper surface of first rigid foam insulation board 1117 faces the lower surface of the upper flange 1114 of a second I-joist 1113 at the second side of first rigid foam insulation board 1117, (3) an outer edge of the first side 1120 of first rigid foam insulation board 1117 faces the web 1116 of the first I-joist 1113, and (4) an outer edge of the second side of first rigid foam insulation board 1117 faces the web 1116 of the second I-joist 1113. As a result of this configuration, the sloped roof assembly comprises a ventilation channel (see the arrows in FIG. 11) having a thickness corresponding to the thickness of the upper flange of the I-joists 1113. This ventilation channel can cool the roof and provide drying potential for the sheathing panel 1110 in the event that there is a leak of water through the upper side of the sheathing panel 1110 which faces the environment. In some of these embodiments, the sloped roof assembly 1101 has a minimum pitch, i.e., angle of approximately 3/12 (rise over horizontal measurement) to allow the ventilation channel to function properly.

Suitable rigid foam insulation boards for use as the first rigid foam insulation board 1117 include any of the rigid foam insulation boards described earlier in this specification. In some implementations, the first rigid foam insulation board 1117 has a thickness of at least 2½ inches, such as 2½ inches, 3 inches, 3½ inches, or 4 inches, or any other value from 2½ to 4 inches, and comprises a polyisocyanurate foam layer and an aluminum foil or coated glass facer adhered to each side of the polyisocyanurate foam layer.

In the sloped roof assembly 1101 depicted in FIG. 11, an outer edge of the first side 1120 of first rigid foam insulation board 1117 faces the web 1116 of a first I-joist 1113 and an outer edge of the second side of first rigid foam insulation board 1117 faces the web 1113 of another I-joist 1113. In some implementations, the outer edge of the first side 1120 of first rigid foam insulation board 1117 abuts the web 1116 of the first I-joist 1113 and edge of the second side of first rigid foam insulation board 1117 abuts the web 1116 of another I-joist 1113, so that these outer edges are not in a spaced-apart relationship relative to web 1116 of the I-joists 1113.

In the particular implementation depicted in FIG. 11, the sloped roof assembly 1101 also includes a generally planar second rigid foam insulation board 1122. The second rigid foam insulation board 1122 comprises: (i) an upper surface 1123, (ii) a lower surface 1124, (iii) a first side 1125, and (iv) a second side (now shown) that is opposite of the first side 1125. Moreover, second rigid foam insulation board 1122 is positioned in the cavity such that: (i) the upper surface 1123 of second rigid foam insulation board 1122 faces the lower surface 1119 of first rigid foam insulation board 1117. In some embodiments, such as is depicted in FIG. 11, the upper surface 1123 of second rigid foam insulation board 1122 abuts the lower surface 1119 of first rigid foam insulation board 1117 so that first rigid foam insulation board 1117 and second rigid foam insulation board 1123 are not in a spaced-apart relationship relative to each other. In other embodiments, however, first rigid foam insulation board 1117 and second rigid foam insulation board 1122 may be placed in a spaced-apart relationship. Such an arrangement could provide an air gap between first rigid foam insulation board 1117 and second rigid foam insulation board 1122 that could further improve the insulation performance of the sloped roof assembly 1101. In these embodiments, the distance between the lower surface 1119 of first rigid foam insulation board 1117 and the upper surface 1123 of second rigid foam insulation board 1122, and hence the height of such an air gap, is, for example, ½ to 6 inches, such as 1 to 3 inches.

In the sloped roof assembly 1101 depicted in FIG. 11, the lower surface 1124 of second rigid foam insulation board 1122 faces the upper surface of the lower flange 1115 of a first I-joist 1113 at the first side 1125 of second rigid foam insulation board 1122, the lower surface 1124 of second rigid foam insulation board 1122 faces the upper surface of the lower flange 1115 of a second I-joist 1113 at the second side of second rigid foam insulation board 1122, an outer edge of the first side 1125 of second rigid foam insulation board 1122 faces the web 1116 of a first I-joist 1113, and an outer edge of the second side 1126 of second rigid foam insulation board 1122 faces the web 1116 of a second I-joist 1113.

Referring still to FIG. 11, it is evident that, in this particular implementation, the lower surface 1124 of second rigid foam insulation board 1122 faces the upper surface of the lower flange 1115 of a first I-joist 1113 at the first side 1125 of second rigid foam insulation board 1124. In addition (though not visible in FIG. 11) the lower surface 1124 of second rigid foam insulation board 1122 faces the upper surface of the lower flange 1115 of a second I-joist 1113 at the second side of second rigid foam insulation board 1122. In some embodiments, both (i) the lower surface 1124 of second rigid foam insulation board 1122 faces the upper surface of the lower flange 1115 of a first I-joist 1113 at the first side 1125 of second rigid foam insulation board 1122 in a spaced-apart relationship relative to each other, and (ii) the lower surface 1124 of second rigid foam insulation board 1122 faces the upper surface of the lower flange of a second I-joist 1115 at the second side of second rigid insulation board in a spaced-apart relationship relative to each other. As such, a gap G is formed between the lower surface 1124 of second rigid foam insulation board and the lower surface of the lower flanges 1115 of I-joists 1113. In some embodiments, such a gap G has a height of 1¼ to 7 inches, as discussed above.

In addition, an outer edge of second rigid foam insulation board 1122 faces the web 1116 of the first I-joist 1113 at a first side and an outer edge of second rigid foam insulation board 1122 faces the web 1116 of the second I-joist 1113 at a second side. In some implementations, the outer edge of the first side of second rigid foam insulation board 1122 abuts the web 1116 of the first I-joist 1113 and an outer edge of the second side of second rigid foam insulation board 1122 abuts the web 1116 of a second I-joist 1113, so that the outer edges are not in a spaced-apart relationship relative to webs 1116 of the I-joists 1113.

In some implementations, the second rigid foam insulation board 1122 has a thickness of at least 1½ inches, such as 1½ to 2 inches, and comprises a polyisocyanurate foam layer and a glass fiber reinforced foil (i.e., aluminum foil) facer material adhered to each side of the polyisocyanurate foam layer.

In some implementations, an adhesive (not illustrated in FIG. 11) is disposed in an aperture formed between one or both of first rigid foam insulation board 1117 and a web 1116 of an I-joist 1113, such as between one or both of the outer edges of sides of first rigid foam insulation board 1117 and web 1116 of a first I-joist 1113 and web 1116 of a second I-joist 1113 and between one or both outer edges of sides of second rigid foam insulation board 1122 and web 1116 of a first I-joist 1113 and web 1116 of a second I-joist 1113. Suitable adhesives include any of the construction adhesives mentioned earlier. In addition, if desired, intermittent blocking or strapping may be attached to the lower flange 1115 of I-joists 1113, such as at the lower surface of lower flange 1115, to provide additional protection against rollover of the sloped roof assembly 1101.

Further, in certain implementations of such the sloped roof assemblies, second rigid foam insulation board 1122 is designed such that, according to the 2018 International Residential Code® ("IRC") Section 2603.9, compliance with the requirements of IRC Sections 2603.4 through 2603.7 is not required, and the combined thermal insulating value of first rigid foam insulation board 1117 and second rigid foam insulation board 1122 is at least R-30 determined per ASTM C 518-17 in accordance with ASTM C-1289-18.

As indicated, and referring still to FIG. 11, the roof panel to floor joist connection further includes a generally horizontally arranged flooring assembly 1200 comprising an end 1210 thereof that is arranged over a wall assembly 1220. In addition, an end 1150 of the sloped roof assembly 1101 overhangs the end 1210 of the flooring assembly 1200 that is arranged over the wall assembly. As used herein "generally horizontally" means not only that the longest dimension of the flooring assembly is exactly perpendicular to the gravity direction at the location of the floor assembly, but also encompasses situations in which the longest dimension of the flooring assembly is not in a perfectly horizontal orientation, such as where the deviation from perfectly horizontal is 10° or less, such as 5° or less, though it will be appreciated that in many cases it may be preferred to minimize such a deviation as much as is practically possible.

In certain implementations, the flooring assembly may comprise any of the flooring assemblies described in this specification. However, other flooring assemblies are suitable as well. In some implementations, however, flooring assembly 1200 comprises a blocking member 1201 that spans between floor joists, such as I-joists, and the end thereof that overlies the wall assembly 1220 and further comprises insulation 1202, such as a rigid foam insulation board of the type described in this specification or spray applied foam insulation, that is positioned between the floor joists and adjacent to the blocking member 1201.

The roof panel to floor joist connection assembly further includes a sloped member 1300 arranged over the end 1210 of the flooring assembly 1200 that is over the wall assembly 1220. In some implementations, the angle of sloped member 1300 will at least generally (within no more than 10%), if not exactly, correspond to the roof pitch. In some implementations, sloped member 1300 comprises a generally horizontally oriented side 1310 that rests atop the flooring assembly 1200. In addition, in some implementations, the sloped member comprises a sloped side 1320 that rests against the lower surface of the lower flange 1115 of the I-joists 1113 in the sloped roof assembly 1101. Thus, this sloped member 1300 is often an elongated member having a length that spans two or more I-joists 1113. The sloped side 1320 of the sloped member 1300 may have an angle that is at least generally, if not exactly, an angle corresponding to the roof pitch. The sloped member 1300 may be constructed of, for example, oriented strand board ("OSB"), plywood, another type of wood or even a metallic material or composite material.

The roof panel to floor joist connection assembly further includes a rigid foam insulation member 1400 arranged in a cavity of the roof assembly 1101 so as to bridge the lower surface of a rigid foam insulation board in the roof assembly to the sloped member. As shown in FIG. 11, for example, rigid foam insulation member 1400 is arranged in the cavity of the roof assembly 1101 and rests on the sloped side 1320 of the sloped member 1300. In addition, the rigid foam insulation member 1400 can be dimensioned so that it has a width at least corresponding to the width of sloped side 1320 of sloped member 1300 and a height that corresponds at least to the height of gap G in the cavity of the sloped roof assembly 1101. As a result, the rigid foam insulation bridges the lower surface of the rigid foam insulation board 1122 to the sloped member 1300, thereby providing continuous rigid foam insulation to the roof panel to floor joist connection assembly. As with sloped member 1300, rigid foam insulation member 1400 is often an elongated member having a length that spans two or more I-joists 1113. The rigid foam insulation member 1400 may have a square or rectangular cross-section, as shown in FIG. 11, but is not limited thereto. The rigid foam insulation member may be constructed of any of the rigid foam insulation board materials described earlier in this specification The roof assemblies described above are currently believed to have a combination of advantages that is not present in previously proposed assemblies. First, they are capable of efficient prefabrication, thereby reducing onsite labor requirements so as to have a low total cost of construction. Such assemblies have an insulation value of at least R-30, or even R-40, while embedding all insulation within the assembly. In addition, they utilize construction materials, including rigid foam insulation boards, which are readily available and not difficult to manufacture. The assemblies can contain various barrier layers, including double or triple redundancy for weather resistive barrier layers (these may include an optional roofing paper or membrane that covers the sheathing panel); a weather resistive barrier than may be integral with the sheathing panel itself (e.g., Huber Zip panel); and the weather resistive facers on the rigid foam insulation panels. In addition to redundant weather barrier layer, the assemblies also include an air barrier layer, a water vapor barrier layer, and thermal insulation layers. The assemblies are also code compliant as a living and storage space, even without an interior sheathing layer. In addition, the assemblies allow for insetting of solar panels, solar tubes, or sky lights, within the roof assembly during fabrication, as well as for insertion of electrical boxes, outlets for lights/fans, support structures for ceiling fans, during fabrication Various aspects of the subject matter described herein are set out in the following numbered clauses:

Clause 1. An insulated roof assembly comprising: (a) a sheathing panel comprising: (1) an upper surface, and (2) a lower surface; (b) a plurality of I-joists positioned in a spaced-apart and generally parallel relationship to each other, the I-joists comprising: (1) an upper flange, (2) a lower flange, and (3) a web extending between the upper flange and the lower flange, wherein the lower surface of the sheathing panel abuts an upper surface of the upper flange of the I-joists so that the sheathing panel and the I-joists define a cavity; (c) a generally planar first rigid foam insulation board comprising: (1) an upper surface, (2) a lower surface, (3) a first side, and (4) a second side that is opposite of the first side, wherein first rigid foam insulation board is positioned in the cavity such that: (1) the upper surface of the first rigid foam insulation board faces the lower surface of the upper flange of a first I-joist at the first side of the first rigid foam insulation board, (2) the upper surface of the first rigid foam insulation board faces the lower surface of the upper flange of a second I-joist at the second side of the first rigid foam insulation board, (3) an outer edge of the first side of the first rigid foam insulation board faces the web of the first I-joist, and (4) an outer edge of the second side of the first rigid foam insulation board faces the web of the second I-joist; and (d) a generally planar second rigid foam insulation board comprising: (1) an upper surface, (2) a lower surface, (3) a first side, and (4) a second side that is opposite of the first side, wherein the second rigid foam insulation board is positioned in the cavity such that: (1) the upper surface of the second rigid foam insulation board faces the lower surface of the first rigid foam insulation board, (2) the lower surface of the second rigid foam insulation board faces the upper surface of the lower flange of a first I-joist at the first side of the second rigid foam insulation board, (3) the lower surface of the second rigid foam insulation board faces the upper surface of the lower flange of a second I-joist at the second side of the second rigid foam insulation board, (4) an outer edge of the first side of the second rigid foam insulation board faces the web of the first I-joist, and (5) an outer edge of the second side of the second rigid foam insulation board faces the web of the second I-joist.

Clause 2. The assembly of clause 1, wherein the first rigid foam insulation board and the second rigid foam insulation board comprises a polyisocyanurate foam board, an expanded polystyrene foam board, or an extruded polystyrene foam board.

Clause 3. The assembly of clause 2, wherein the first rigid foam insulation board and the second rigid foam insulation board each comprise a facer material on an upper face and/or a lower face of a foam layer.

Clause 4. The assembly of clause 3, wherein the first rigid foam insulation board has a thickness of 2½ to 4 inches and comprises a polyisocyanurate foam layer and an aluminum foil facer or coated glass facer adhered to each side of the polyisocyanurate foam layer.

Clause 5. The assembly of one of clause 1 to clause 4, wherein an outer edge of the first side of the first rigid foam insulation board abuts the web of the first I-joist and an outer edge of the second side of the first rigid foam insulation board abuts the web of the second I-joist, so that the outer edges are not in a spaced-apart relationship relative to web of the first I-joist and the web of the second I-joist.

Clause 6. The assembly of one of clause 1 to clause 5, wherein the upper surface of the second rigid foam insulation board abuts the lower surface of the first rigid foam insulation board so that first rigid foam insulation board and second rigid foam insulation board are not in a spaced-apart relationship relative to each other.

Clause 7. The assembly of one of clause 1 to clause 6, wherein the upper surface of the second rigid foam insulation board faces the lower surface of the first rigid foam insulation board such that first rigid foam insulation board and second rigid foam insulation board are in a spaced-apart relationship.

Clause 8. The assembly of one of clause 1 to clause 7, wherein: (i) the lower surface of the second rigid foam insulation board faces the upper surface of the lower flange of a first I-joist at the first side of the second rigid foam insulation board in a spaced-apart relationship, and (ii) the lower surface of the second rigid foam insulation board faces the upper surface of the lower flange of a second I-joist at the second side of the second rigid insulation board in a spaced-apart relationship, such that a gap is formed between the lower surface of the second rigid foam insulation board and the lower surface of the lower flanges of the first I-joist and the second I-joist, the gap having a height of 1¼ to 7 inches.

Clause 9. The assembly of clause 8, wherein the outer edge of the first side of the second rigid foam insulation board abuts the web of the first I-joist and the outer edge of the second side of the second rigid foam insulation board abuts the web of the second I-joist so that the outer edges are not in a spaced-apart relationship relative to web of the first I-joist and the web of the second I-joist.

Clause 10. The assembly of one of clause 3 to clause 9, wherein the second rigid foam insulation board has a thickness of 1½ to 2 inches and comprises a polyisocyanurate foam layer and a glass fiber reinforced foil facer material adhered to each side of the polyisocyanurate foam layer.

Clause 11. The assembly of one of clause 1 to clause 10, wherein the second rigid foam insulation board is designed such that according to the 2018 International Residential Code® ("IRC") Section 2603.9, compliance with the requirements of IRC Sections 2603.4 through 2603.7 is not required.

Clause 12. The assembly of one of clause 1 to clause 11, wherein the combined thermal insulating value of the first rigid foam insulation board and the second rigid foam insulation board is at least R-30 determined per ASTM C 518-17 in accordance with ASTM C-1289-18.

Clause 13. The assembly of one of clause 1 to clause 12, wherein the first rigid foam insulation board and the second rigid foam insulation board each have a thickness ranging from 1 inch to 4 inch and the combined thermal insulating value of the first rigid foam insulation board and the second rigid foam insulation board is at least R-30 determined per ASTM C 518-17 in accordance with ASTM C-1289-18.

Clause 14. A method for making a roof assembly comprising: (a) positioning an assembly on a support, the assembly comprising: (1) a first I-joist comprising an upper flange, a lower flange, and a web extending between the upper flange and the lower flange, (2) a second I-joist comprising an upper flange, a lower flange, and a web extending between the upper flange and the lower flange, (3) a generally planar first rigid foam insulation board comprising an upper surface, a lower surface, a first side, and a second side that is opposite of the first side, and (4) a generally planar second rigid foam insulation board comprising an upper surface, a lower surface, a first side, and a second side that is opposite of the first side, wherein: (i) the first I-joist and the second I-joist are positioned in a spaced-apart and generally parallel relationship to each other; (ii) the first rigid foam insulation board and the second rigid foam insulation board are positioned between the first I-joist and the second I-joists; (iii) the first rigid foam insulation board is positioned between the first I-joist and the second I-joist such that: (A) the upper surface of the first rigid foam insulation board faces the lower surface of the upper flange of a first I-joist at the first side of the first rigid foam insulation board, (B) the upper surface of the first rigid foam insulation board faces the lower surface of the upper flange of a second I-joist at the second side of the first rigid foam insulation board, (C) an outer edge of the first side of the first rigid foam insulation board faces the web of the first I-joist, and (D) an outer edge of the second side of the first rigid foam insulation board faces the web of the second I-joist; and (iv) the second rigid foam insulation board is positioned between the first I-joist and the second I-joist such that: (A) the upper surface of the second rigid foam insulation board faces the lower surface of the first rigid foam insulation board, (B) the lower surface of the second rigid foam insulation board faces the upper surface of the lower flange of a first I-joist at the first side of the second rigid foam insulation board, (C) the lower surface of the second rigid foam insulation board faces the upper surface of the lower flange of a second I-joist at the second side of the second rigid foam insulation board, (D) an outer edge of the first side of the rigid foam insulation board faces the web of the first I-joist, and (E) an outer edge of the second side of the rigid foam insulation board faces the web of the second I-joist; (b) squaring the assembly; and (c) attaching a sheathing panel to the upper surface of the upper flange of the first I-joist and the second I-joist of the squared assembly.

Clause 15. The method of clause 14, wherein the positioning the assembly on the support comprises: (1) placing the first I-joist on the support surface; (2) positioning the first rigid foam insulation board and the second rigid foam insulation board against the first I-joist such that: (i) the upper surface of the second rigid foam insulation board faces the lower surface of the first rigid foam insulation board, (ii) the upper surface of the first rigid foam insulation board faces the lower surface of the upper flange of the first I-joist at the first side of the first rigid foam insulation board, (iii) the outer edge of the first side of the first rigid foam insulation board faces the web of the first I-joist, (iv) the lower surface of the second rigid foam insulation board faces the upper surface of the lower flange of the first I-joist at the first side of the second rigid foam insulation board, and (v) the outer edge of the first side of the second rigid foam insulation board faces the web of the first I-joist; and (3) positioning the second I-joist against the first rigid foam insulation board and the second rigid foam insulation board such that: (i) the upper surface of the first rigid foam insulation board faces the lower surface of the upper flange of the second I-joist at the second side of the first rigid foam insulation board, (ii) the outer edge of the second side of the first rigid foam insulation board faces the web of the second I-joist; (iii) the lower surface of the second rigid foam insulation board faces the upper surface of the lower flange of a second I-joist at the second side of the second rigid foam insulation board, and (iv) the outer edge of the second side of the second rigid foam insulation board faces the web of the second I-joist.

Clause 16. The method of clause 14 or clause 15, further comprising using a locator means to maintain a selected spacing between the first I-joist and the second I-joist by placing the first I-joist and the second I-joists against the locator means.

Clause 17. The method of one of clause 14 to clause 16, further comprising applying an adhesive between the web of the I-joists and the rigid foam insulation boards.

Clause 18. The method of one of clause 14 to clause 17, wherein a support is used to position the first rigid foam insulation board and the second rigid foam insulation board, the support being dimensioned so that the distance between the lower surface of the sides of the second rigid foam insulation board and the lower surface of the lower flange of the I-joists in the resulting assembly is 1¼ to 7 inches.

Clause 19. The method of one of clause 14 to clause 18, wherein an adjustable squaring means is used to square the assembly prior to attaching sheathing panels to the I-joists.

Clause 20. The method of one of clause 14 to clause 19, wherein the first rigid foam insulation board and the second rigid foam insulation board comprises a polyisocyanurate foam board, an expanded polystyrene foam board, or an extruded polystyrene foam board.

Clause 21. The method of one of clause 14 to clause 20, wherein the first rigid foam insulation board and the second rigid foam insulation board each comprise a facer material on an upper face and/or a lower face of a foam layer.

Clause 22. The method of one of clause 14 to clause 21, wherein the first rigid foam insulation board has a thickness of 2½ to 4 inches and comprises a polyisocyanurate foam layer and an aluminum foil facer or coated glass facer adhered to each side of the polyisocyanurate foam layer.

Clause 23. The method of one of clause 14 to clause 22, comprising positioning an outer edge of the first side of the first rigid foam insulation board to abut the web of the first I-joist and an outer edge of the second side of the first rigid foam insulation board to abut the web of the second I-joist, so that the outer edges are not in a spaced-apart relationship relative to web of the first I-joist and the web of the second I-joist.

Clause 24. The method of one of clause 14 to clause 23, comprising positioning the upper surface of the second rigid foam insulation board to abut the lower surface of the first rigid foam insulation board so that first rigid foam insulation board and second rigid foam insulation board are not in a spaced-apart relationship relative to each other.

Clause 25. The method of one of clause 14 to clause 24, comprising positioning the upper surface of the second rigid foam insulation board to face the lower surface of the first rigid foam insulation board such that first rigid foam insulation board and second rigid foam insulation board are in a spaced-apart relationship.

Clause 26. The method of one of clause 14 to clause 25, comprising: (i) positioning the lower surface of the second rigid foam insulation board to face the upper surface of the lower flange of the first I-joist at the first side of the second rigid foam insulation board in a spaced-apart relationship, and (ii) positioning the lower surface of the second rigid foam insulation board to face the upper surface of the lower flange of the second I-joist at the second side of the second rigid insulation board in a spaced-apart relationship, such that a gap is formed between the lower surface of the second rigid foam insulation board and the lower surface of the lower flanges of the first I-joist and the second I-joist, the gap having a height of 1¼ to 7 inches.

Clause 27. The method of clause 26, comprising positioning the outer edge of the first side of the second rigid foam insulation board to abut the web of the first I-joist and the outer edge of the second side of the second rigid foam insulation board to abut the web of the second I-joist so that the outer edges are not in a spaced-apart relationship relative to web of the first I-joist and the web of the second I-joist.

Clause 28. The method of one of clause 21 to clause 27, wherein the second rigid foam insulation board has a thickness of 1½ to 2 inches and comprises a polyisocyanurate foam layer and a glass fiber reinforced foil facer material adhered to each side of the polyisocyanurate foam layer.

Clause 29. The method of one of clause 14 to clause 28, wherein the second rigid foam insulation board is designed such that according to the 2018 International Residential Code® ("IRC") Section 2603.9, compliance with the requirements of IRC Sections 2603.4 through 2603.7 is not required.

Clause 30. The method of one of clause 14 to clause 29, wherein the combined thermal insulating value of the first rigid foam insulation board and the second rigid foam insulation board is at least R-30 determined per ASTM C 518-17 in accordance with ASTM C-1289-18.

Clause 31. The method of one of clause 14 to clause 30, wherein the first rigid foam insulation board and the second rigid foam insulation board each have a thickness ranging from 1 inch to 4 inch and the combined thermal insulating value of the first rigid foam insulation board and the second rigid foam insulation board is at least R-30 determined per ASTM C 518-17 in accordance with ASTM C-1289-18.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:
1. An insulated roof assembly comprising:
   (a) a sheathing panel comprising:
      (1) an upper surface, and
      (2) a lower surface;
   (b) a plurality of I-joists positioned in a spaced-apart and generally parallel relationship to each other, the I-joists comprising:
      (1) an upper flange,
      (2) a lower flange, and
      (3) a web extending between the upper flange and the lower flange,
   wherein the lower surface of the sheathing panel abuts an upper surface of the upper flange of the I-joists so that the sheathing panel and the I-joists define a cavity;
   (c) a generally planar first rigid foam insulation board comprising:
      (1) an upper surface,
      (2) a lower surface,
      (3) a first side, and
      (4) a second side that is opposite of the first side,
   wherein first rigid foam insulation board is positioned in the cavity such that:

(1) the upper surface of the first rigid foam insulation board faces the lower surface of the upper flange of a first I-joist at the first side of the first rigid foam insulation board, (2) the upper surface of the first rigid foam insulation board faces the lower surface of the upper flange of a second I-joist at the second side of the first rigid foam insulation board, (3) an outer edge of the first side of the first rigid foam insulation board faces the web of the first I-joist, and (4) an outer edge of the second side of the first rigid foam insulation board faces the web of the second I-joist; and (d) a generally planar second rigid foam insulation board comprising:
  (1) an upper surface,
  (2) a lower surface,
  (3) a first side, and
  (4) a second side that is opposite of the first side, wherein the second rigid foam insulation board is positioned in the cavity such that:
  (1) the upper surface of the second rigid foam insulation board faces the lower surface of the first rigid foam insulation board,
  (2) the lower surface of the second rigid foam insulation board faces the upper surface of the lower flange of a first I-joist at the first side of the second rigid foam insulation board,
  (3) the lower surface of the second rigid foam insulation board faces the upper surface of the lower flange of a second I-joist at the second side of the second rigid foam insulation board,
  (4) an outer edge of the first side of the second rigid foam insulation board faces the web of the first I-joist, and
  (5) an outer edge of the second side of the second rigid foam insulation board faces the web of the second I-joist, wherein the insulated roof assembly comprises a ventilation channel having a thickness corresponding to the thickness of the upper flange of the first I-joist and the second I-joist.

2. The insulated roof assembly of claim 1, wherein the first rigid foam insulation board and the second rigid foam insulation board comprises a polyisocyanurate foam board, an expanded polystyrene foam board, or an extruded polystyrene foam board.

3. The insulated roof assembly of claim 2, wherein the first rigid foam insulation board and the second rigid foam insulation board each comprise a facer material on an upper face and/or a lower face of a foam layer.

4. The insulated roof assembly of claim 3, wherein the first rigid foam insulation board has a thickness of 2½ to 4 inches and comprises a polyisocyanurate foam layer and an aluminum foil facer or coated glass facer adhered to each side of the polyisocyanurate foam layer.

5. The insulated roof assembly of claim 1, wherein an outer edge of the first side of the first rigid foam insulation board abuts the web of the first I-joist and an outer edge of the second side of the first rigid foam insulation board abuts the web of the second I-joist, so that the outer edges are not in a spaced-apart relationship relative to web of the first I-joist and the web of the second I-joist.

6. The insulated roof assembly of claim 1, wherein the upper surface of the second rigid foam insulation board abuts the lower surface of the first rigid foam insulation board so that first rigid foam insulation board and second rigid foam insulation board are not in a spaced-apart relationship relative to each other.

7. The insulated roof assembly of claim 1, wherein the upper surface of the second rigid foam insulation board faces the lower surface of the first rigid foam insulation board such that first rigid foam insulation board and second rigid foam insulation board are in a spaced-apart relationship.

8. The insulated roof assembly of claim 1, wherein:
  (i) the lower surface of the second rigid foam insulation board faces the upper surface of the lower flange of a first I-joist at the first side of the second rigid foam insulation board in a spaced-apart relationship, and
  (ii) the lower surface of the second rigid foam insulation board faces the upper surface of the lower flange of a second I-joist at the second side of the second rigid insulation board in a spaced-apart relationship,
  such that a gap is formed between the lower surface of the second rigid foam insulation board and the lower surface of the lower flanges of the first I-joist and the second I-joist, the gap having a height of 1¼ to 7 inches.

9. The insulated roof assembly of claim 8, wherein the outer edge of the first side of the second rigid foam insulation board abuts the web of the first I-joist and the outer edge of the second side of the second rigid foam insulation board abuts the web of the second I-joist so that the outer edges are not in a spaced-apart relationship relative to web of the first I-joist and the web of the second I-joist.

10. The insulated roof assembly of claim 4, wherein the second rigid foam insulation board has a thickness of 1½ to 2 inches and comprises a polyisocyanurate foam layer and a glass fiber reinforced foil facer material adhered to each side of the polyisocyanurate foam layer.

11. The insulated roof assembly of claim 1, wherein the second rigid foam insulation board is designed such that according to the 2018 International Residential Code® ("IRC") Section 2603.9, compliance with the requirements of IRC Sections 2603.4 through 2603.7 is not required.

12. The insulated roof assembly of claim 1, wherein the combined thermal insulating value of the first rigid foam insulation board and the second rigid foam insulation board is at least R-30 determined per ASTM C 518-17 in accordance with ASTM C-1289-18.

13. The insulated roof assembly of claim 1, wherein the first rigid foam insulation board and the second rigid foam insulation board each have a thickness ranging from 1 inch to 4 inch and the combined thermal insulating value of the first rigid foam insulation board and the second rigid foam insulation board is at least R-30 determined per ASTM C 518-17 in accordance with ASTM C-1289-18.

14. A method for making a roof assembly comprising:
  (a) positioning an assembly on a support, the assembly comprising:
    (1) a first I-joist comprising an upper flange, a lower flange, and a web extending between the upper flange and the lower flange,
    (2) a second I-joist comprising an upper flange, a lower flange, and a web extending between the upper flange and the lower flange,
    (3) a generally planar first rigid foam insulation board comprising an upper surface, a lower surface, a first side, and a second side that is opposite of the first side, and (4) a generally planar second rigid foam insulation board comprising an upper surface, a lower surface, a first side, and a second side that is opposite of the first side, wherein:
(i) the first I-joist and the second I-joist are positioned in a spaced-apart and generally parallel relationship to each other;
(ii) the first rigid foam insulation board and the second rigid foam insulation board are positioned between the first I-joist and the second I-joists;
(iii) the first rigid foam insulation board is positioned between the first I-joist and the second I-joist such that: (A) the upper surface of the first rigid foam insulation board faces the lower surface of the upper flange of a first I-joist at the first side of the first rigid foam insulation board, (B) the upper surface of the first rigid foam insulation board faces the lower surface of the upper flange of a second I-joist at the second side of the first rigid foam insulation board, (C) an outer edge of the first side of the first rigid foam insulation board faces the web of the first I-joist, and (D) an outer edge of the second side of the first rigid foam insulation board faces the web of the second I-joist; and
(iv) the second rigid foam insulation board is positioned between the first I-joist and the second I-joist such that: (A) the upper surface of the second rigid foam insulation board faces the lower surface of the first rigid foam insulation board, (B) the lower surface of the second rigid foam insulation board faces the upper surface of the lower flange of a first I-joist at the first side of the second rigid foam insulation board, (C) the lower surface of the second rigid foam insulation board faces the upper surface of the lower flange of a second I-joist at the second side of the second rigid foam insulation board, (D) an outer edge of the first side of the second rigid foam insulation board faces the web of the first I-joist, and (E) an outer edge of the second side of the second rigid foam insulation board faces the web of the second I-joist;

(b) squaring the assembly that is placed on the support; and
(c) attaching a sheathing panel to the upper surface of the upper flange of the first I-joist and the second I-joist of the squared assembly that is placed on the support,
wherein the first rigid foam insulation board is positioned between the first I-joist and the second I-joist such that a ventilation channel having a thickness corresponding to the thickness of the upper flange of the first I-joist and the second I-joist is formed.

15. The method for making a roof assembly of claim 14, wherein the positioning the assembly on a surface of the support comprises:
(1) placing the first I-joist on the support surface;
(2) positioning the first rigid foam insulation board and the second rigid foam insulation board against the first I-joist such that:
(i) the upper surface of the second rigid foam insulation board faces the lower surface of the first rigid foam insulation board,
(ii) the upper surface of the first rigid foam insulation board faces the lower surface of the upper flange of the first I-joist at the first side of the first rigid foam insulation board,
(iii) the outer edge of the first side of the first rigid foam insulation board faces the web of the first I-joist,
(iv) the lower surface of the second rigid foam insulation board faces the upper surface of the lower flange of the first I-joist at the first side of the second rigid foam insulation board, and
(v) the outer edge of the first side of the second rigid foam insulation board faces the web of the first I-joist; and
(3) positioning the second I-joist against the first rigid foam insulation board and the second rigid foam insulation board such that:
(i) the upper surface of the first rigid foam insulation board faces the lower surface of the upper flange of the second I-joist at the second side of the first rigid foam insulation board,
(ii) the outer edge of the second side of the first rigid foam insulation board faces the web of the second I-joist;
(iii) the lower surface of the second rigid foam insulation board faces the upper surface of the lower flange of a second I-joist at the second side of the second rigid foam insulation board, and
(iv) the outer edge of the second side of the second rigid foam insulation board faces the web of the second I-joist.

16. The method for making a roof assembly of claim 14, further comprising using a locator means to maintain a selected spacing between the first I-joist and the second I-joist by placing the first I-joist and the second I-joists against the locator means.

17. The method for making a roof assembly of claim 14, further comprising applying an adhesive between the web of the first and second I-joists and the first and second rigid foam insulation boards.

18. The method for making a roof assembly of claim 14, wherein a second support is used to position the first rigid foam insulation board and the second rigid foam insulation board, the second support being dimensioned so that the distance between the lower surface of the sides of the second rigid foam insulation board and the lower surface of the lower flange of the first and second I-joists in the resulting assembly is 1¼ to 7 inches.

19. The method for making a roof assembly of claim 14, wherein an adjustable squaring means is used to square the assembly prior to attaching sheathing panels to the first and second I-joists.

20. The method for making a roof assembly of claim 14, wherein the first rigid foam insulation board and the second rigid foam insulation board comprises a polyisocyanurate foam board, an expanded polystyrene foam board, or an extruded polystyrene foam board.

21. The method for making a roof assembly of claim 20, wherein the first rigid foam insulation board and the second rigid foam insulation board each comprise a facer material on an upper face and/or a lower face of a foam layer.

22. The method for making a roof assembly of claim 21, wherein the first rigid foam insulation board has a thickness of 2½ to 4 inches and comprises a polyisocyanurate foam layer and an aluminum foil facer or coated glass facer adhered to each side of the polyisocyanurate foam layer.

23. The method for making a roof assembly of claim 14, comprising positioning an outer edge of the first side of the first rigid foam insulation board to abut the web of the first I-joist and an outer edge of the second side of the first rigid foam insulation board to abut the web of the second I-joist, so that the outer edges are not in a spaced-apart relationship relative to web of the first I-joist and the web of the second I-joist.

24. The method for making a roof assembly of claim 14, comprising positioning the upper surface of the second rigid foam insulation board to abut the lower surface of the first rigid foam insulation board so that first rigid foam insulation board and second rigid foam insulation board are not in a spaced-apart relationship relative to each other.

25. The method for making a roof assembly of claim 14, comprising positioning the upper surface of the second rigid foam insulation board to face the lower surface of the first rigid foam insulation board such that first rigid foam insulation board and second rigid foam insulation board are in a spaced-apart relationship.

26. The method for making a roof assembly of claim 14, comprising:
   (i) positioning the lower surface of the second rigid foam insulation board to face the upper surface of the lower flange of the first I-joist at the first side of the second rigid foam insulation board in a spaced-apart relationship, and
   (ii) positioning the lower surface of the second rigid foam insulation board to face the upper surface of the lower flange of the second I-joist at the second side of the second rigid insulation board in a spaced-apart relationship,
   such that a gap is formed between the lower surface of the second rigid foam insulation board and the lower surface of the lower flanges of the first I-joist and the second I-joist, the gap having a height of 1¼ to 7 inches.

27. The method for making a roof assembly of claim 26, comprising positioning the outer edge of the first side of the second rigid foam insulation board to abut the web of the first I-joist and the outer edge of the second side of the second rigid foam insulation board to abut the web of the second I-joist so that the outer edges are not in a spaced-apart relationship relative to web of the first I-joist and the web of the second I-joist.

28. The method for making a roof assembly of claim 21, wherein the second rigid foam insulation board has a thickness of 1½ to 2 inches and comprises a polyisocyanurate foam layer and a glass fiber reinforced foil facer material adhered to each side of the polyisocyanurate foam layer.

29. The method for making a roof assembly of claim 14, wherein the second rigid foam insulation board is designed such that according to the 2018 International Residential Code® ("IRC") Section 2603.9, compliance with the requirements of IRC Sections 2603.4 through 2603.7 is not required.

30. The method for making a roof assembly of claim 14, wherein the combined thermal insulating value of the first rigid foam insulation board and the second rigid foam insulation board is at least R-30 determined per ASTM C 518-17 in accordance with ASTM C-1289-18.

31. The method for making a roof assembly of claim 14, wherein the first rigid foam insulation board and the second rigid foam insulation board each have a thickness ranging from 1 inch to 4 inch and the combined thermal insulating value of the first rigid foam insulation board and the second rigid foam insulation board is at least R-30 determined per ASTM C 518-17 in accordance with ASTM C-1289-18.

32. The insulated roof assembly of claim 1, wherein the upper flange, the lower flange, and the web of the plurality of I-joists are all constructed of wood.

33. The method for making a roof assembly of claim 14, wherein the upper flange, the lower flange, and the web of the plurality of I-joists are all constructed of wood.

\* \* \* \* \*